US011425730B2

United States Patent
Pison et al.

(10) Patent No.: US 11,425,730 B2
(45) Date of Patent: Aug. 23, 2022

(54) METHOD FOR THE REDUCTION OF INTERFERENCE CAUSED BY A PRIVATE MOBILE RADIO-COMMUNICATION NETWORK INFRASTRUCTURE, THE ASSOCIATED SOFTWARE AND BASE STATION OF A PRIVATE MOBILE RADIO-COMMUNICATION NETWORK INFRASTRUCTURE

(71) Applicant: Air Lynx, Les Ulis (FR)

(72) Inventors: Laurent Pison, Les Ulis (FR); Didier Raffenoux, Les Ulis (FR)

(73) Assignee: BULL SAS, Les Clayes-sous-Bois (FR)

(*) Notice: Subject to any disclaimer, the term of this patent is extended or adjusted under 35 U.S.C. 154(b) by 37 days.

(21) Appl. No.: 16/722,463

(22) Filed: Dec. 20, 2019

(65) Prior Publication Data

US 2020/0367256 A1 Nov. 19, 2020

(30) Foreign Application Priority Data

Dec. 21, 2018 (FR) ...................................... 1874035

(51) Int. Cl.
*H04W 72/08* (2009.01)
*H04W 28/02* (2009.01)
(Continued)

(52) U.S. Cl.
CPC ..... *H04W 72/082* (2013.01); *H04W 28/0236* (2013.01); *H04W 52/241* (2013.01);
(Continued)

(58) Field of Classification Search
CPC .......... H04W 72/082; H04W 28/0236; H04W 52/241; H04W 52/243; H04W 72/0413;
(Continued)

(56) References Cited

U.S. PATENT DOCUMENTS 8,909,269 B2 * 12/2014 Pedersen ............. H04W 52/242
370/332
10,660,077 B2 * 5/2020 MolavianJazi ....... H04W 52/16
(Continued)

FOREIGN PATENT DOCUMENTS

| CN | 108391276 A | 8/2018 |
|---|---|---|
| JP | 3279191 B2 | 4/2002 |

OTHER PUBLICATIONS

Search Report as issued in French Patent Application No. 1874035, dated Jun. 28, 2019.
(Continued)

*Primary Examiner* — Brian T O Connor
(74) *Attorney, Agent, or Firm* — ARC IP Law, PC; Joseph J. Mayo

(57) ABSTRACT

A method includes for at least one mobile terminal connected to a base station of the infrastructure, obtaining of at least once characteristic of at least one radio-communication signal occupying a frequency band used by the base station and the mobile terminal to communicate with each other and received by the mobile terminal or by the base station; searching, using the at least one characteristic of a disturbance in the frequency band; and, if a disturbance is detected in the frequency band, decreasing a transmission power of the base station at least in a transmission frequency band used by the base station to transmit radio-communication signals to at least one connected mobile terminal.

10 Claims, 20 Drawing Sheets

Figure 1:
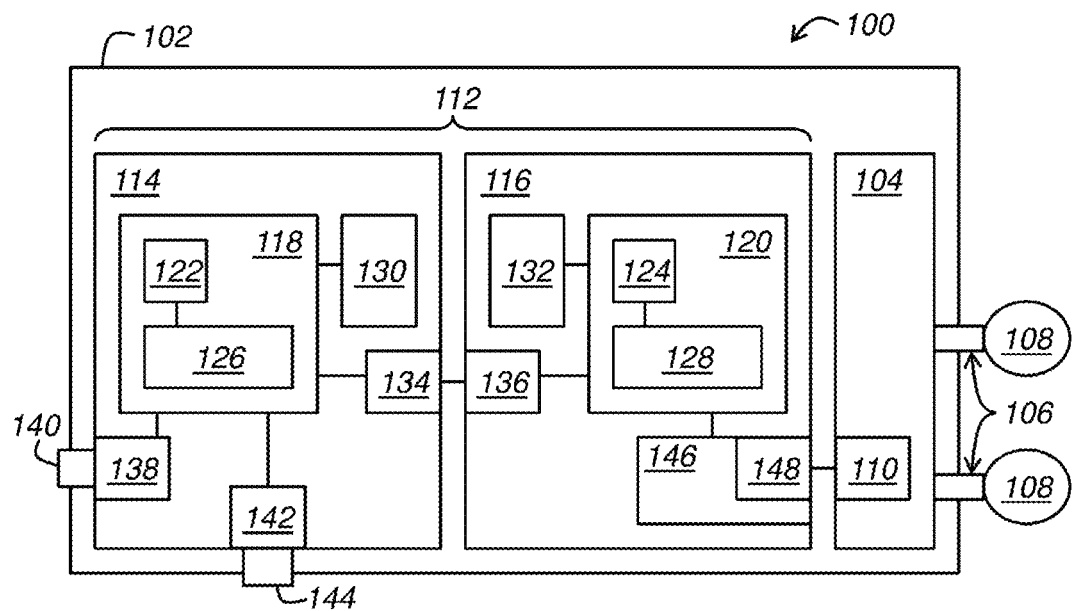

(51) Int. Cl.
*H04W 52/24* (2009.01)
*H04W 72/04* (2009.01)
*H04W 72/12* (2009.01)
*H04W 84/10* (2009.01)

(52) U.S. Cl.
CPC ....... *H04W 52/243* (2013.01); *H04W 72/042* (2013.01); *H04W 72/0413* (2013.01); *H04W 72/0453* (2013.01); *H04W 72/1231* (2013.01); *H04W 84/105* (2013.01)

(58) Field of Classification Search
CPC ........... H04W 72/042; H04W 72/0453; H04W 72/1231; H04W 84/105; H04W 16/10; H04W 76/45; H04W 52/10
See application file for complete search history.

(56) References Cited

U.S. PATENT DOCUMENTS

| | | | |
|---|---|---|---|
| 2008/0240030 A1* | 10/2008 | Kolding | H04L 5/0037 370/329 |
| 2010/0302959 A1* | 12/2010 | Breuer | H04W 24/02 370/252 |
| 2012/0015659 A1 | 1/2012 | Kalyani et al. | |
| 2012/0231833 A1 | 9/2012 | Kolding et al. | |
| 2014/0024380 A1* | 1/2014 | Pedersen | H04W 52/247 455/438 |
| 2016/0374098 A1 | 12/2016 | Jöngren et al. | |
| 2017/0063484 A1 | 3/2017 | Naghshvar | |
| 2019/0200365 A1* | 6/2019 | Sampath | H04B 1/3838 |
| 2020/0053724 A1* | 2/2020 | MolavianJazi | H04W 52/146 |
| 2020/0059283 A1* | 2/2020 | Venugopal | H04B 7/0639 |
| 2020/0076711 A1* | 3/2020 | Li | H04L 43/16 |
| 2020/0137607 A1* | 4/2020 | Akkarakaran | H04W 56/009 |
| 2020/0137731 A1* | 4/2020 | Wei | H04W 72/0453 |

OTHER PUBLICATIONS

Search Report and notification dated Nov. 18, 2021, in EP19219173.2 (7 pages), and English Machine Translation thereof.

* cited by examiner

METHOD FOR THE REDUCTION OF INTERFERENCE CAUSED BY A PRIVATE MOBILE RADIO-COMMUNICATION NETWORK INFRASTRUCTURE, THE ASSOCIATED SOFTWARE AND BASE STATION OF A PRIVATE MOBILE RADIO-COMMUNICATION NETWORK INFRASTRUCTURE

CROSS-REFERENCE TO RELATED APPLICATIONS

This application claims the benefit of French Patent Application No. 1874035 filed Dec. 21, 2018, the disclosure of which is herein incorporated by reference in its entirety.

This invention relates to a method for the reduction of interference caused by a private mobile radio-communication network infrastructure, associated software and a base station of a private mobile radio-communication network infrastructure.

Private mobile radio-communication (or "PMR") network infrastructures are known in the state of the art, comprising a core network module, a subscribers' server and a base station module.

A PMR mobile infrastructure is, in general, an infrastructure used by a small team of users (up to 100 users, or even 1000 users), for a time-limited task, for example, a rescue mission or a law-enforcement mission. Thus, it often occurs that several teams, each equipped with its own PMR infrastructure, participate in the same mission.

However, during the mission, the PMR infrastructures can approximate each other, such that they disturb each other.

Therefore, the object of the invention is a method for the reduction of interference caused by a private mobile radio-communication network comprising: at least one mobile terminal connected to a base station of the infrastructure, obtaining at least one characteristic of at least one radio-communication signal occupying a frequency band used by the base station and the mobile terminal to communicate with each other and received by the mobile terminal or by the base station; searching, using the characteristic(s) of a disturbance in the frequency band; and, if a disturbance is detected in the frequency band, decreasing a transmission power of the base station at least in one transmission frequency band used by the base station to transmit radio-communication signals to at least one connected mobile terminal.

Optionally, the at least one radio-communication signal comprises a downlink radio-communication signal, transmitted by the base station and received by the mobile terminal.

Also optionally, the at least one radio-communication signal comprises an uplink radio-communication signal, transmitted by the mobile terminal and received by the base station.

Also optionally, the at least one characteristic comprises one or more from among: a signal-to-noise ratio, a signal-to-interference-plus-noise ratio and a reference signal received quality.

Also optionally, the method further comprises the obtaining of a distance separating the mobile terminal from the base station, and the searching for a disturbance takes the distance into account.

Also optionally, the method further comprises the suspension of transmission by the base station in the frequency band for an interval of time, and the at least one radio-communication signal comprises a radio-communication signal received by the base station during the interval of time.

Also optionally, the method further comprises, in response to a request from the base station, the suspension of transmission by the mobile terminal in the frequency band for an interval of time, and the at least one radio-communication signal comprises a radio-communication signal received by the base station during the interval of time.

Also optionally, the at least one characteristic of the radio-communication signal received by the base station during the interval of time comprises a power of this radio-communication signal.

A computer program, downloadable from a communication network and/or recorded on a medium readable by computer and/or executable by a processor, is also proposed, characterized in that it comprises instructions for the execution of the steps of a method for the reduction of interference according to the invention, when said program is executed on a computer.

Also proposed is a base station of a private mobile radio-communication network infrastructure comprising software means and/or equipments for: for at least one mobile terminal connected to the base station, obtaining of at least once characteristic of at least one radio-communication signal occupying a frequency band used by the base station and the mobile terminal to communicate with each other and received by the mobile terminal or by the base station; searching, using the characteristic(s) of a disturbance in the frequency band; and, if a disturbance is detected in the frequency band, decreasing a transmission power at least in a transmission frequency band used by the base station to transmit radio-communication signals to at least one connected mobile terminal.

Figure 2:
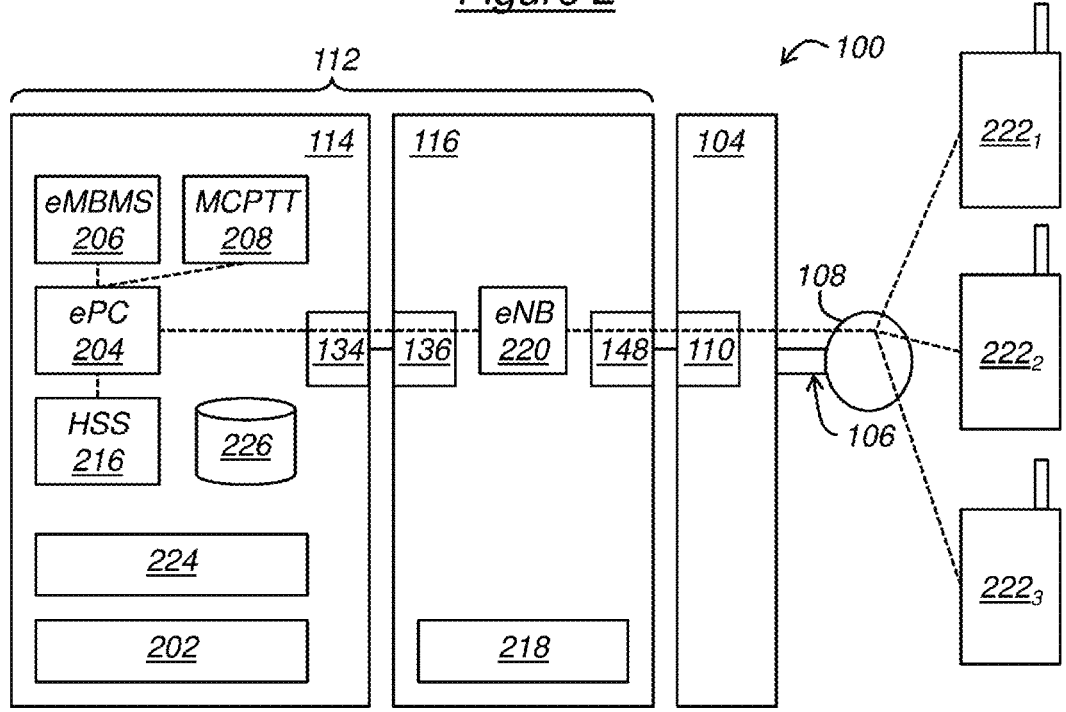
Figure 3:
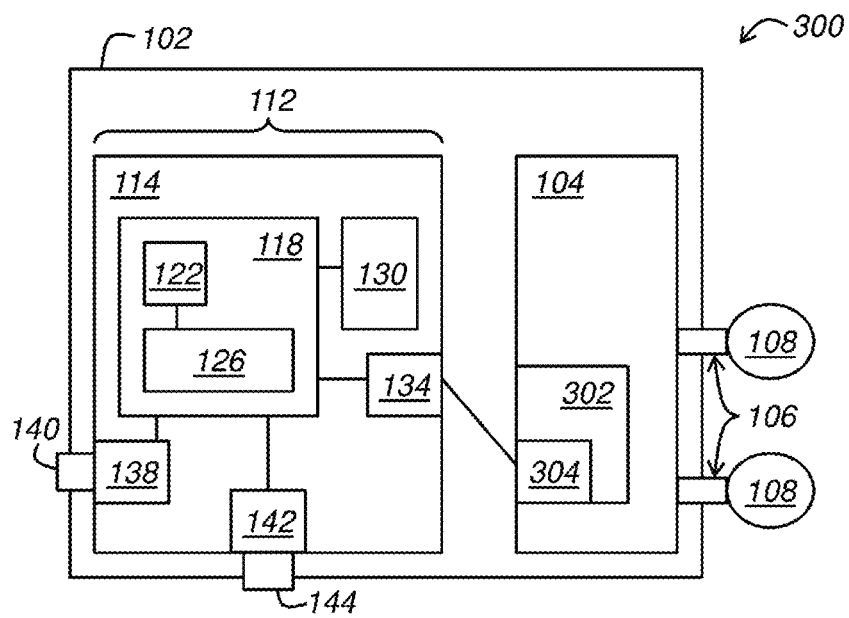
Figure 4:
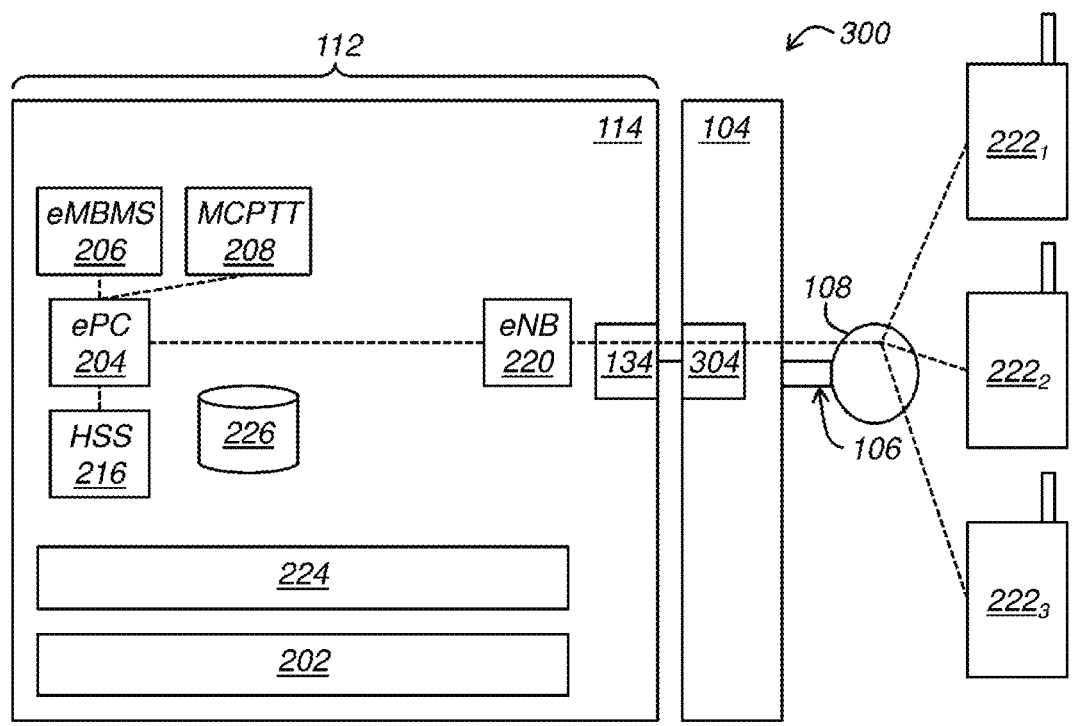
Figure 5:
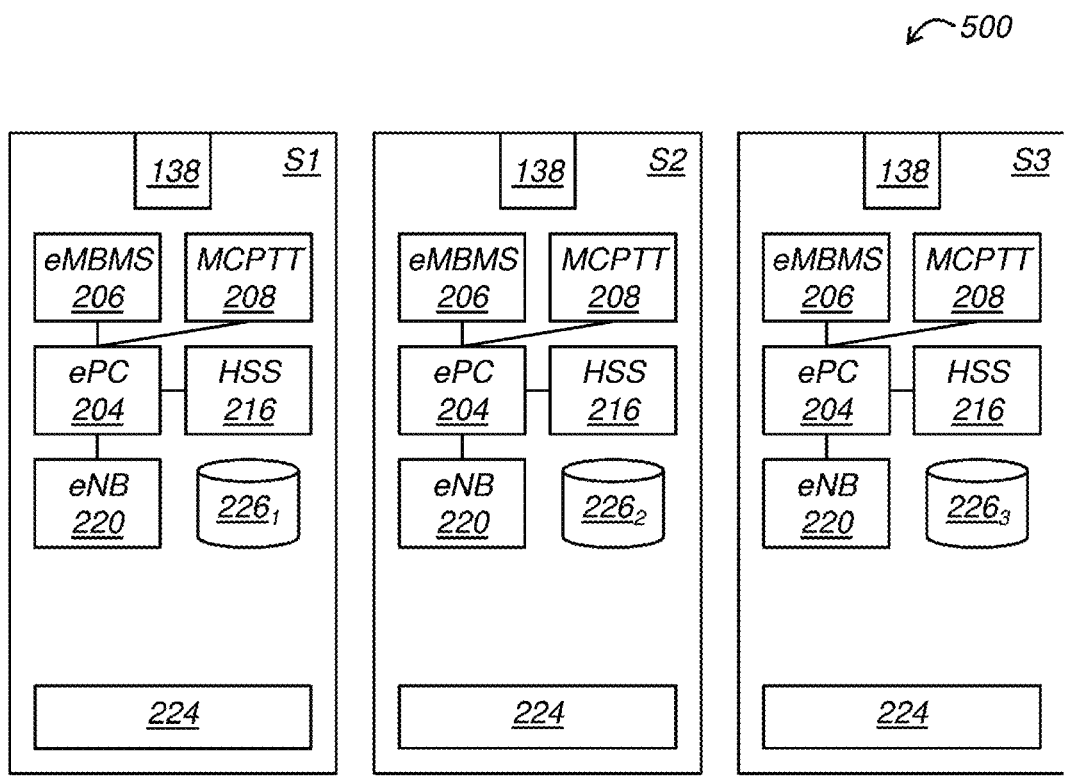
Figure 6:
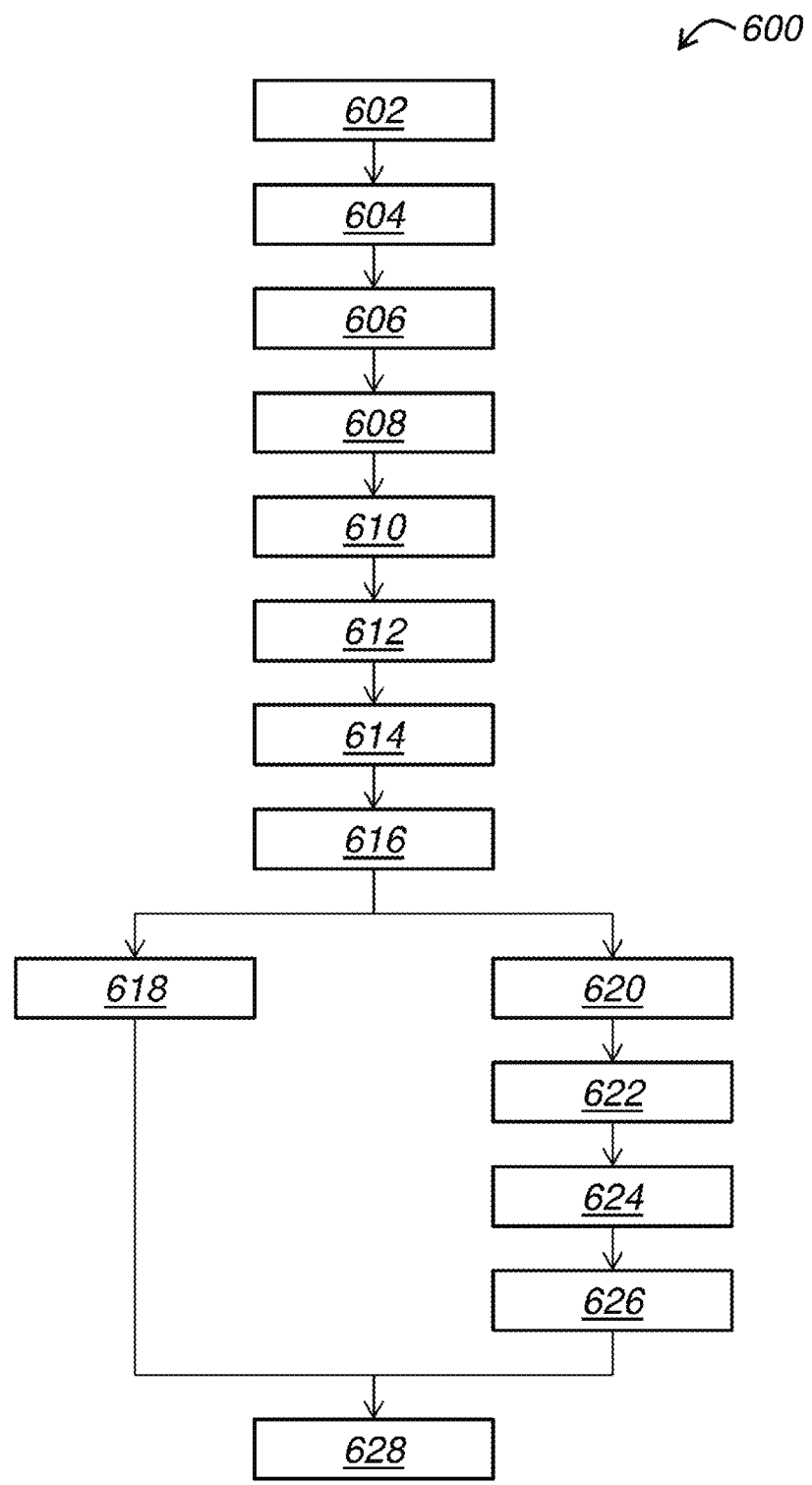
Figure 7:
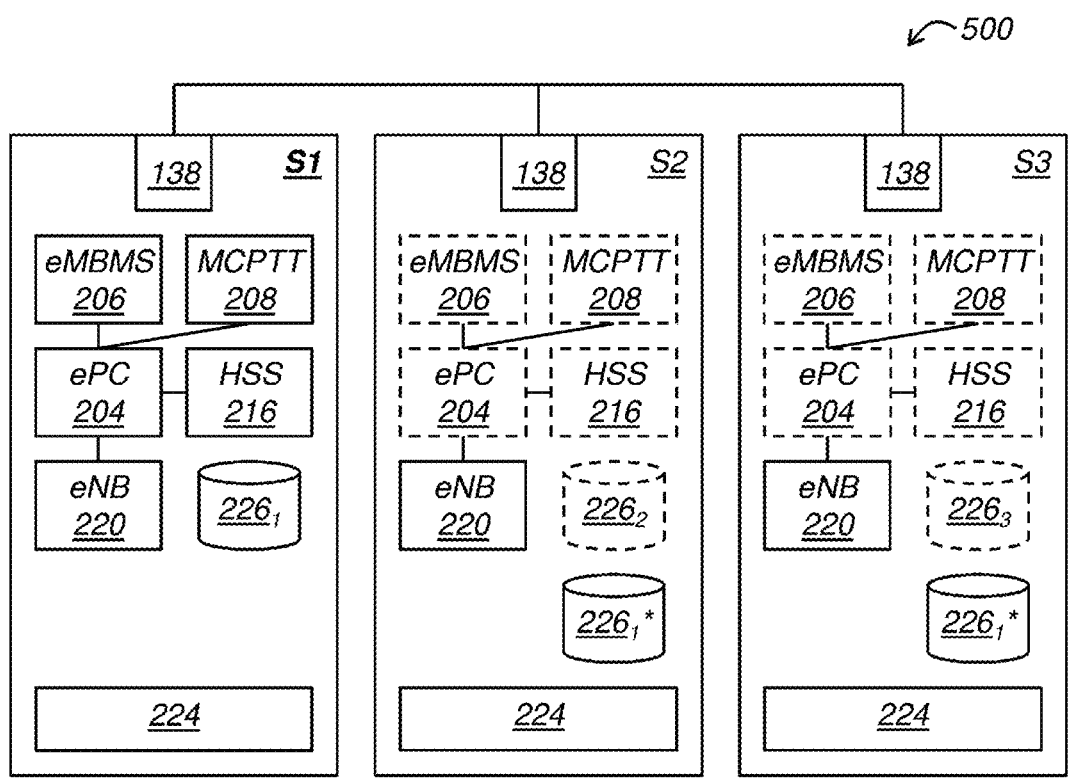
Figure 8:
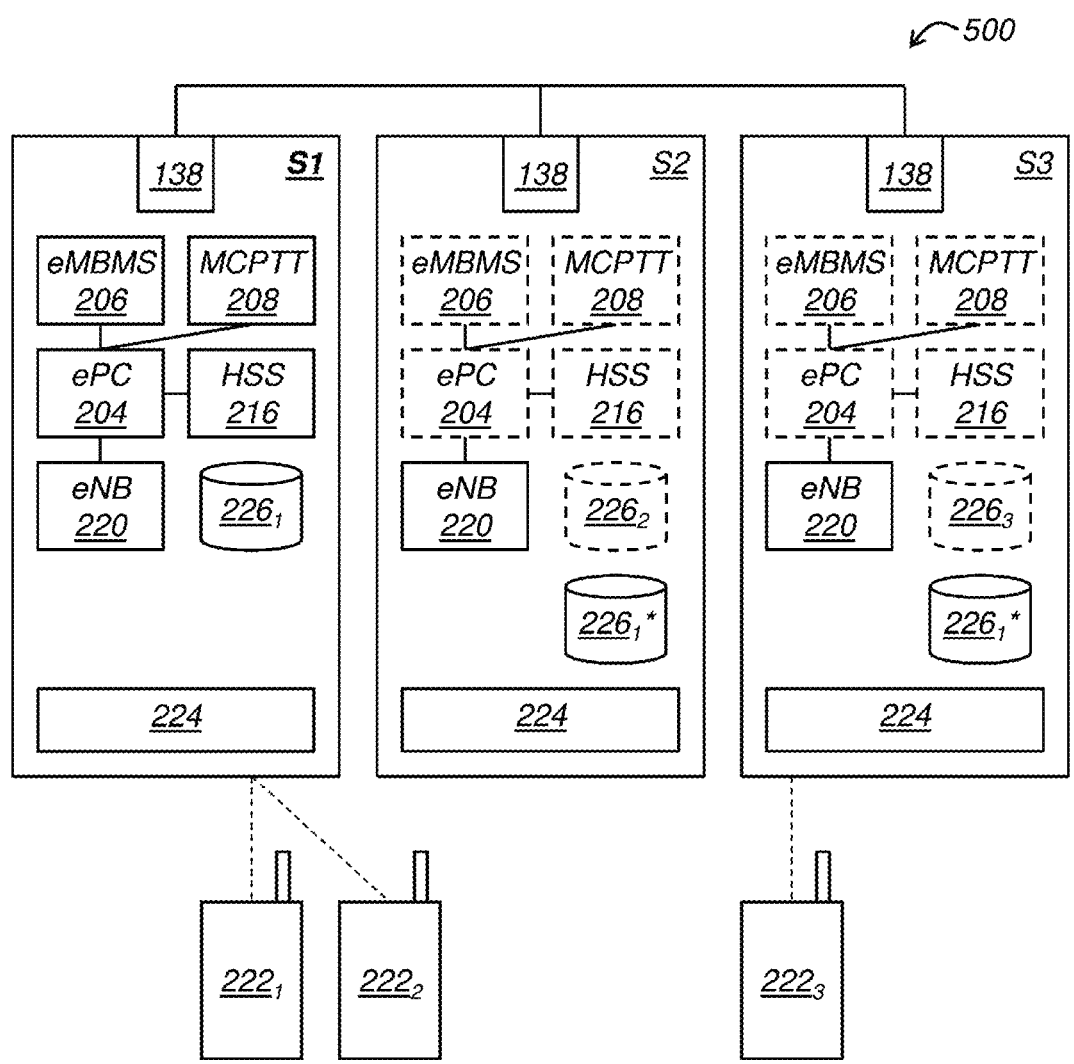
Figure 9:
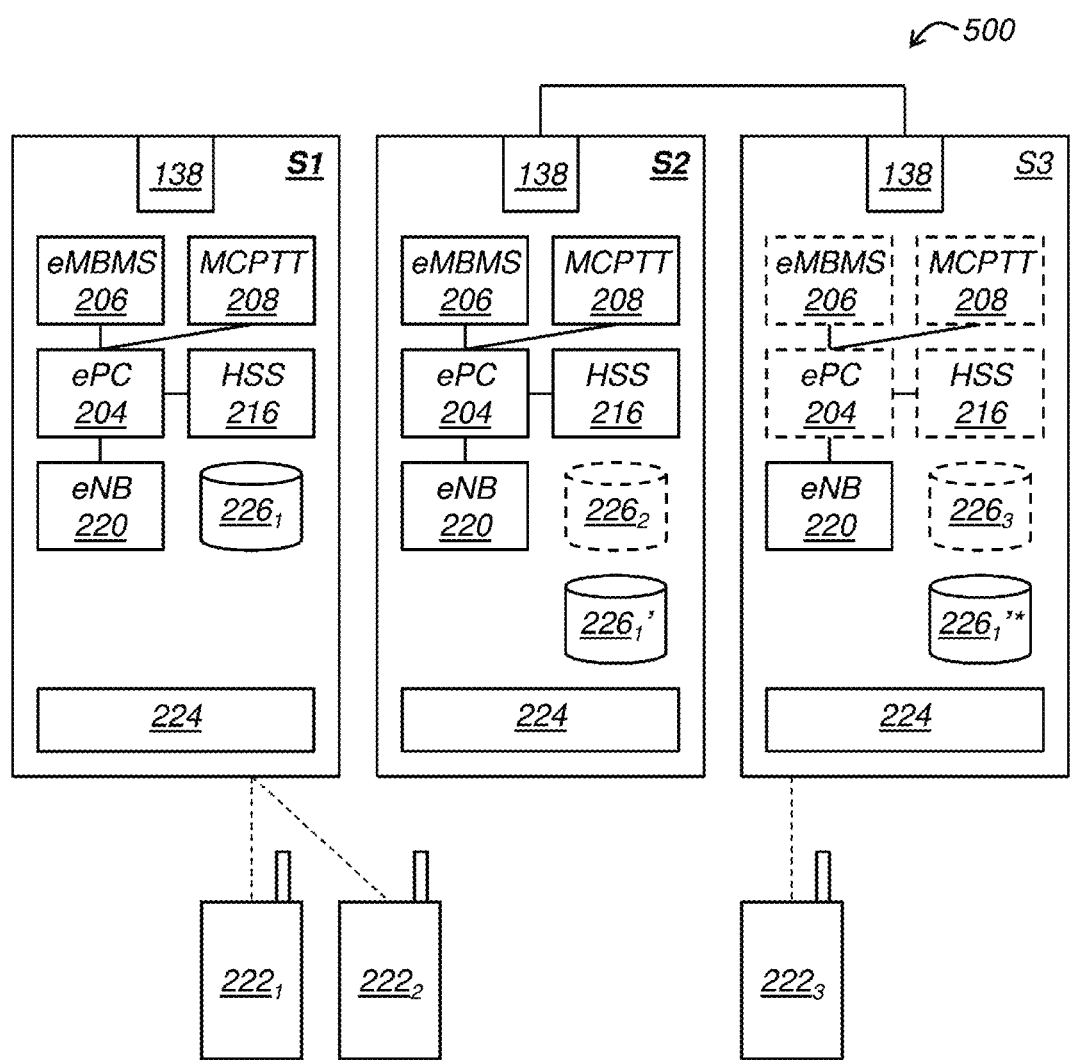
Figure 10:
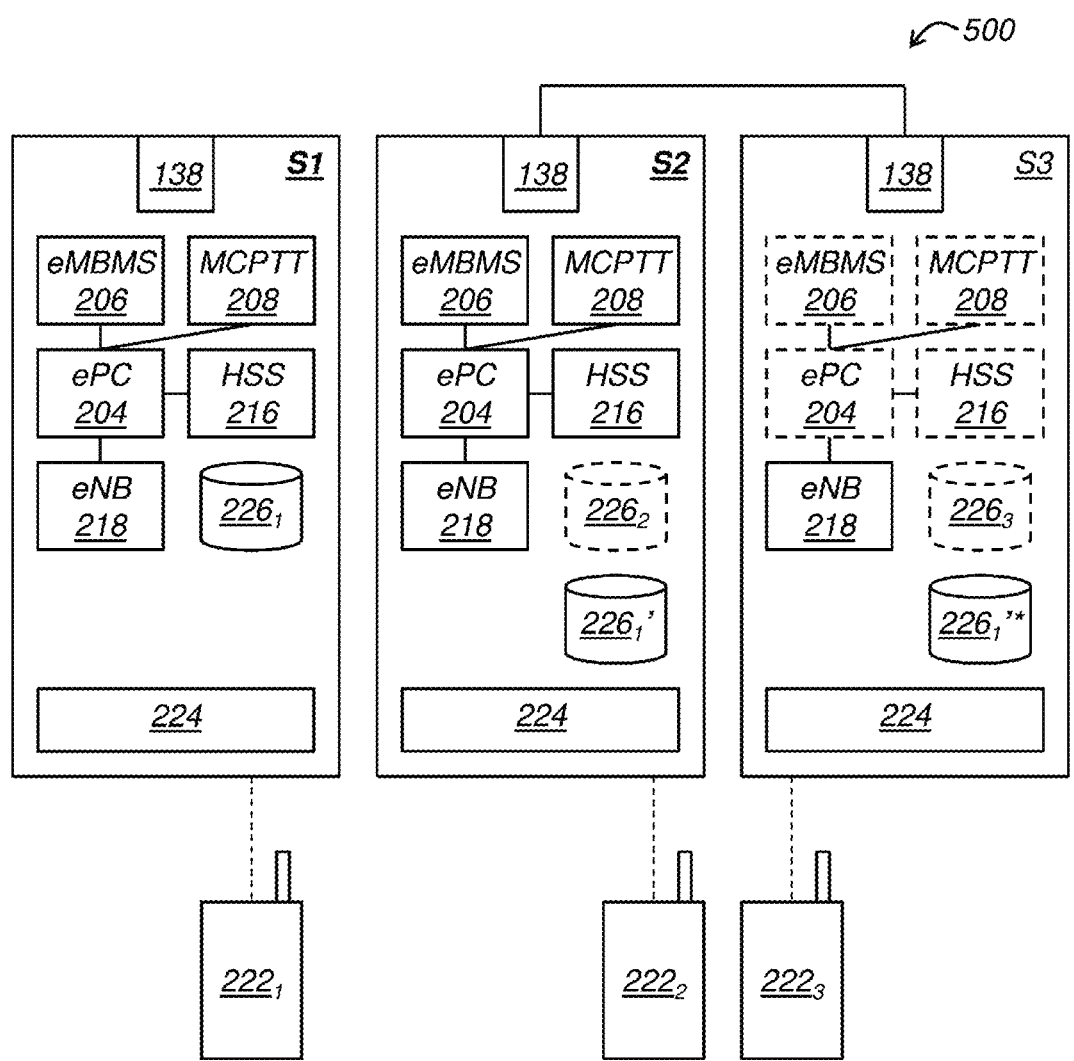
Figure 11:
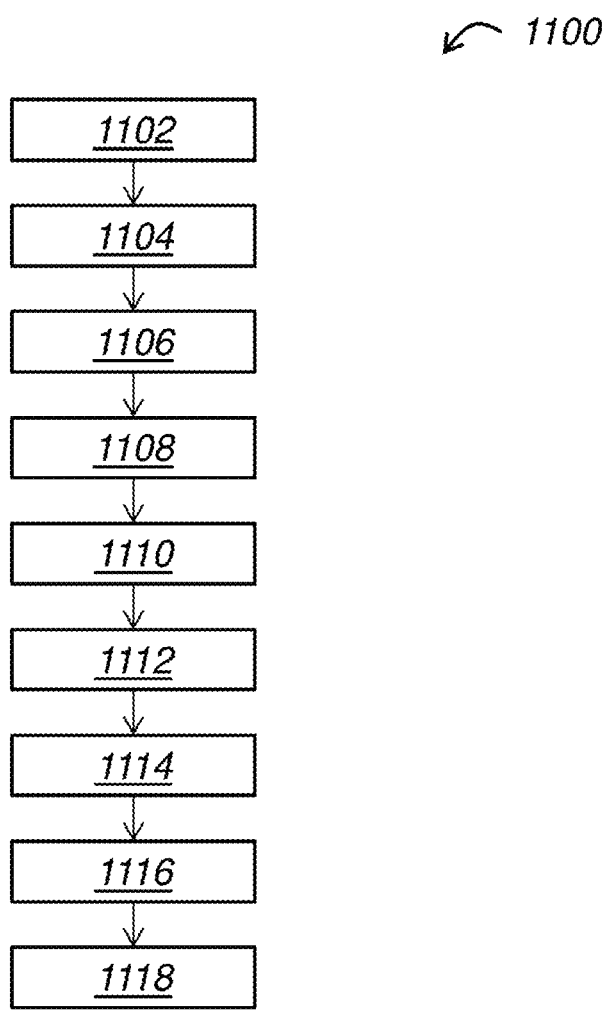
Figure 12:
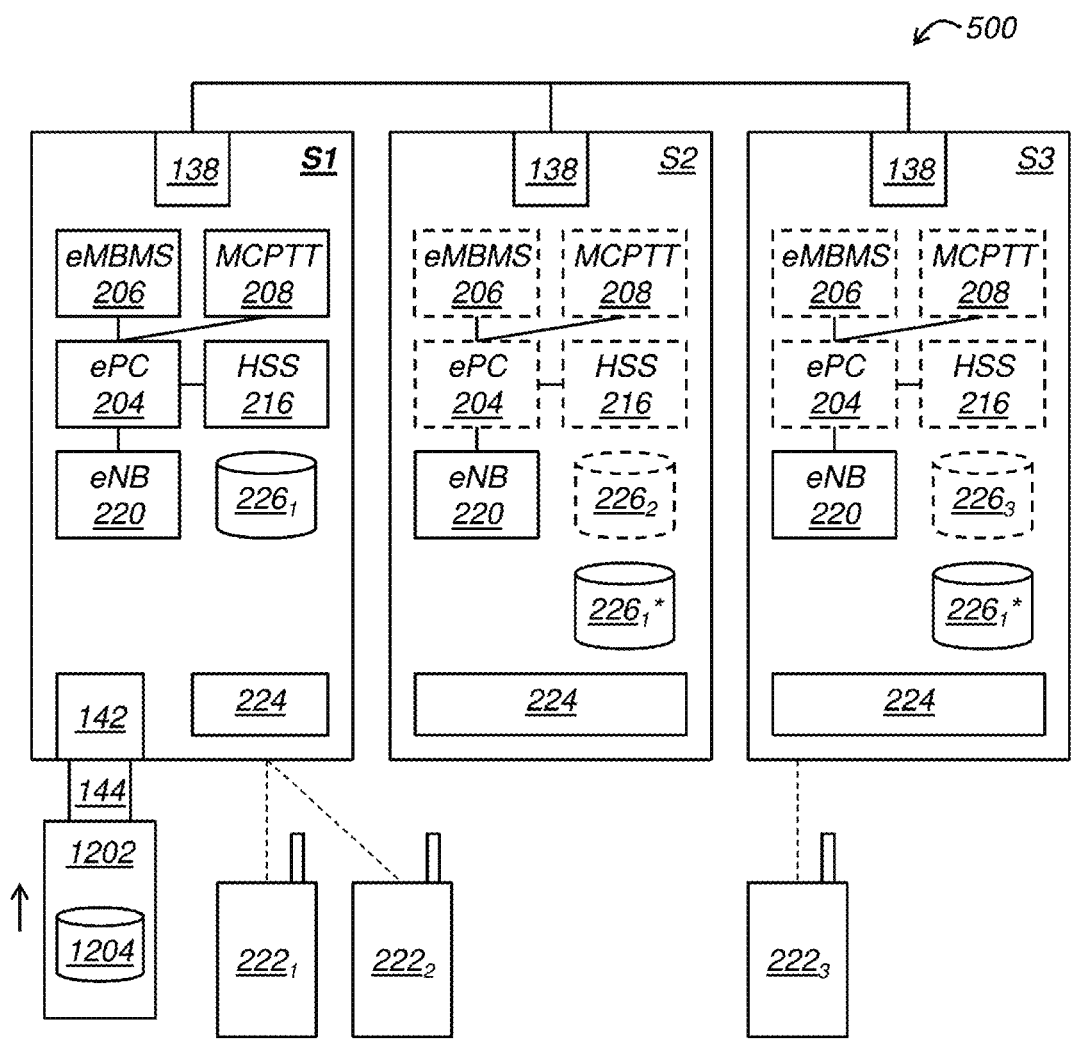
Figure 13:
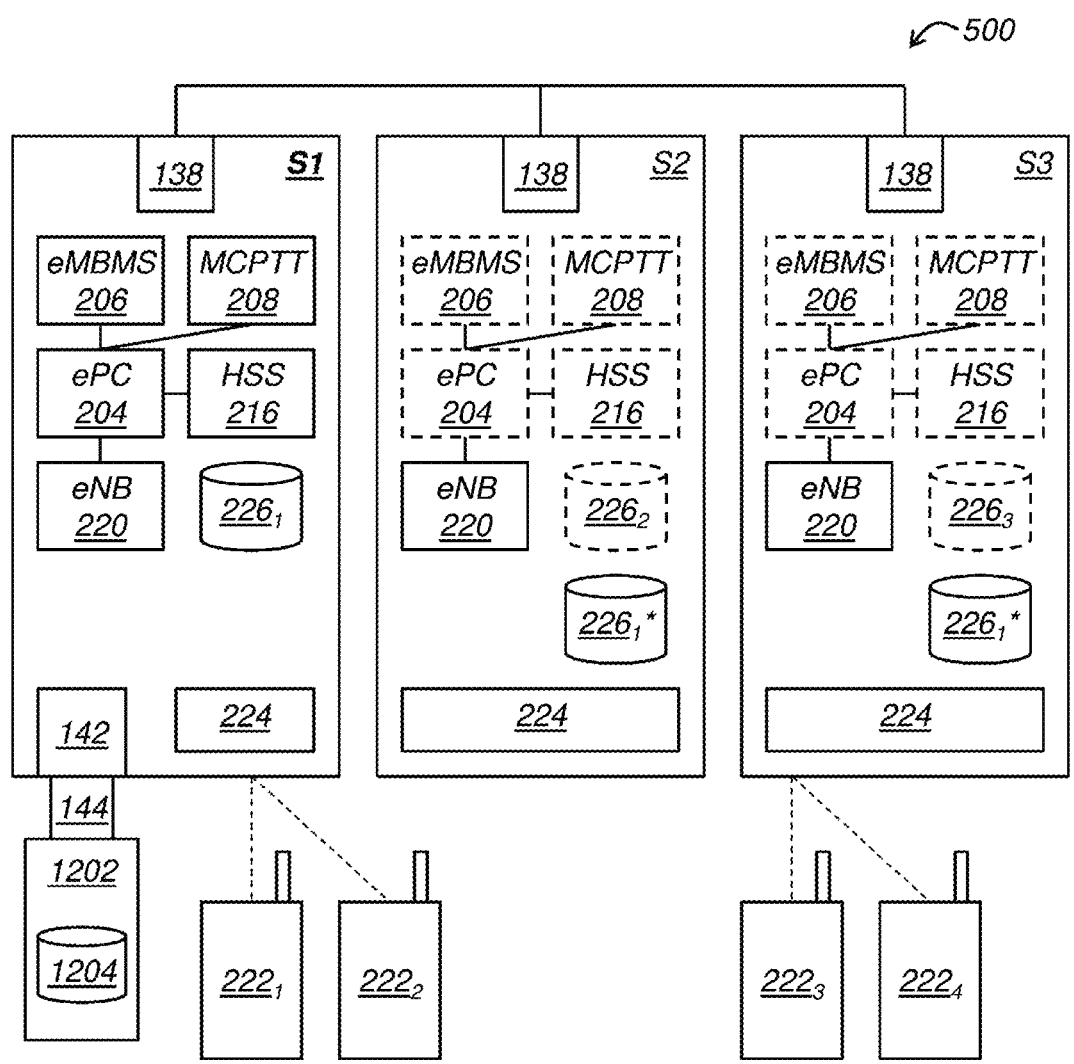
Figure 14:
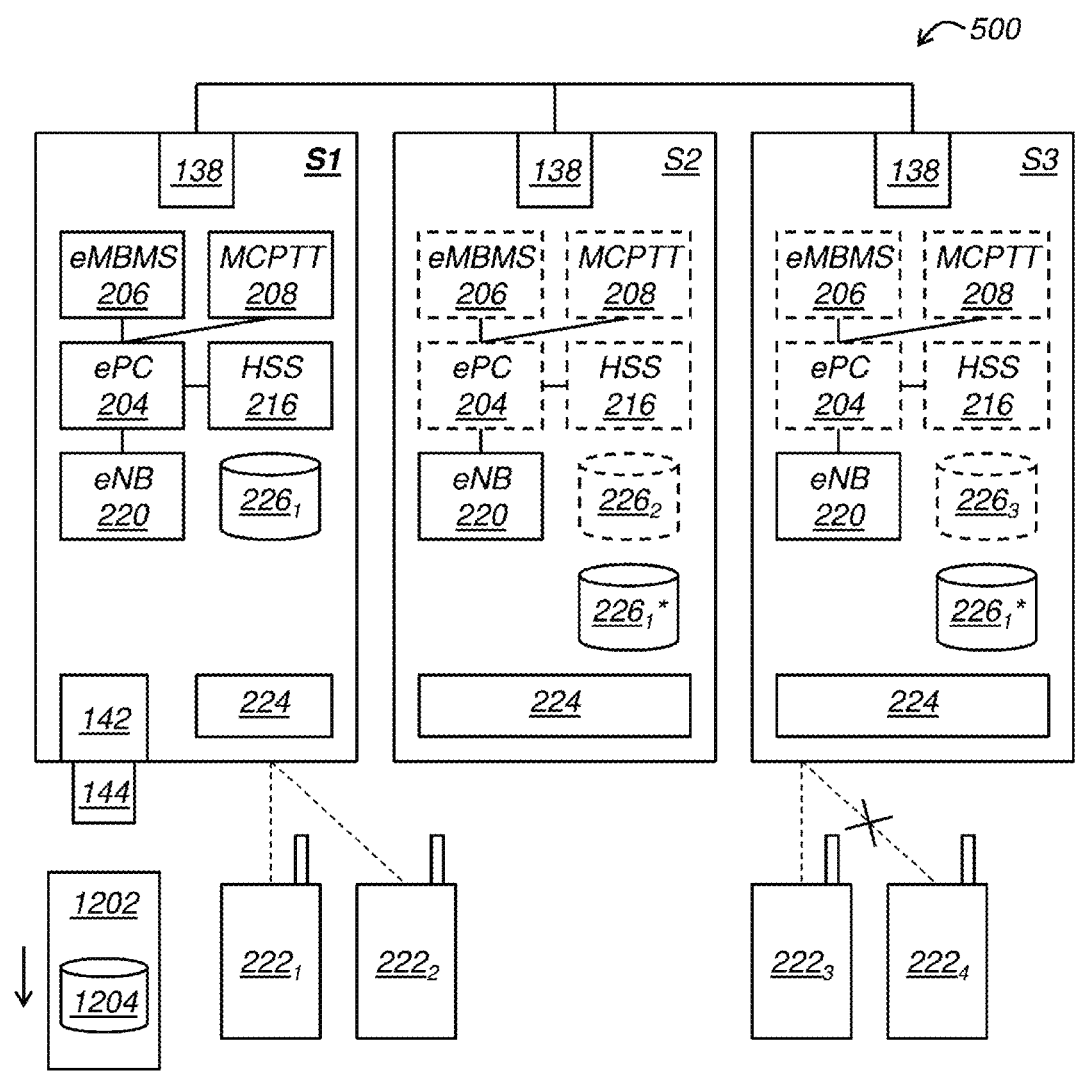
Figure 15:
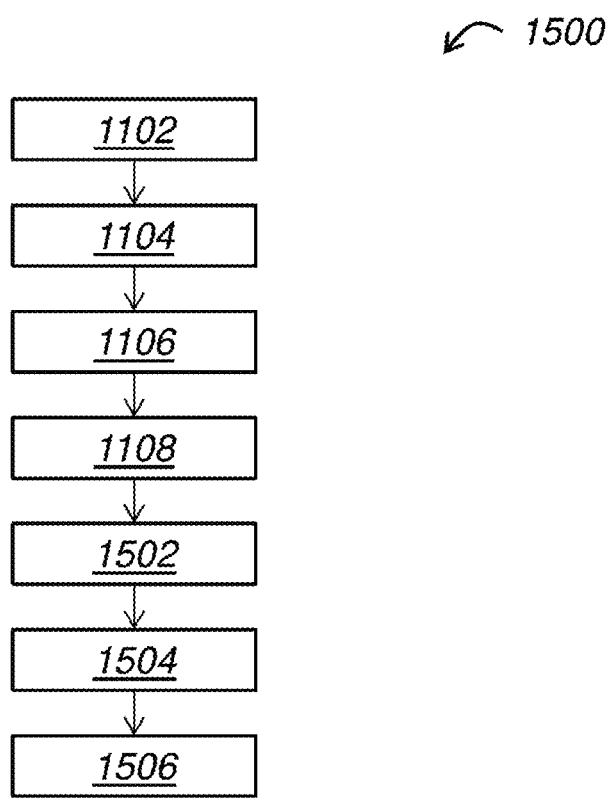
Figure 16:
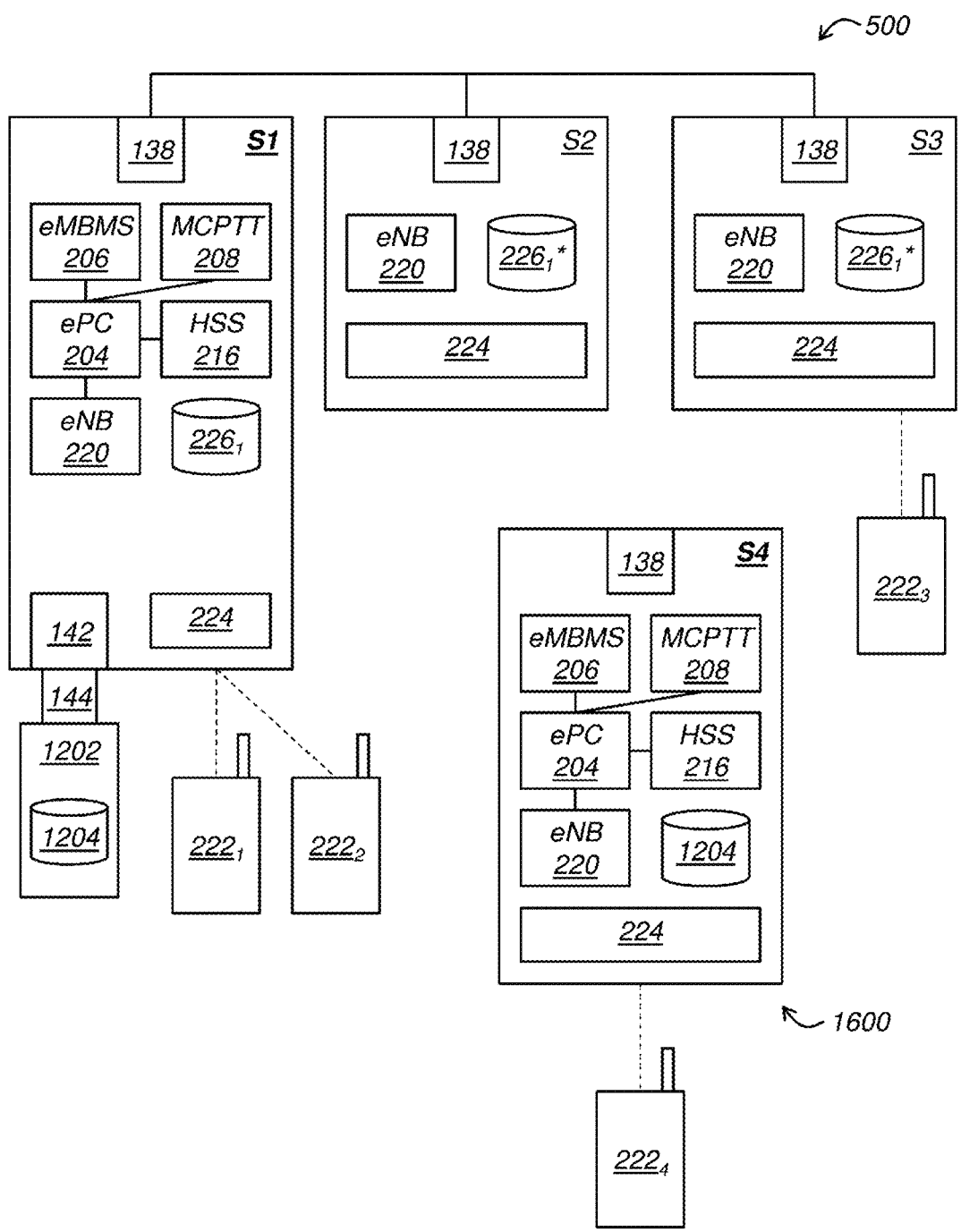
Figure 17:
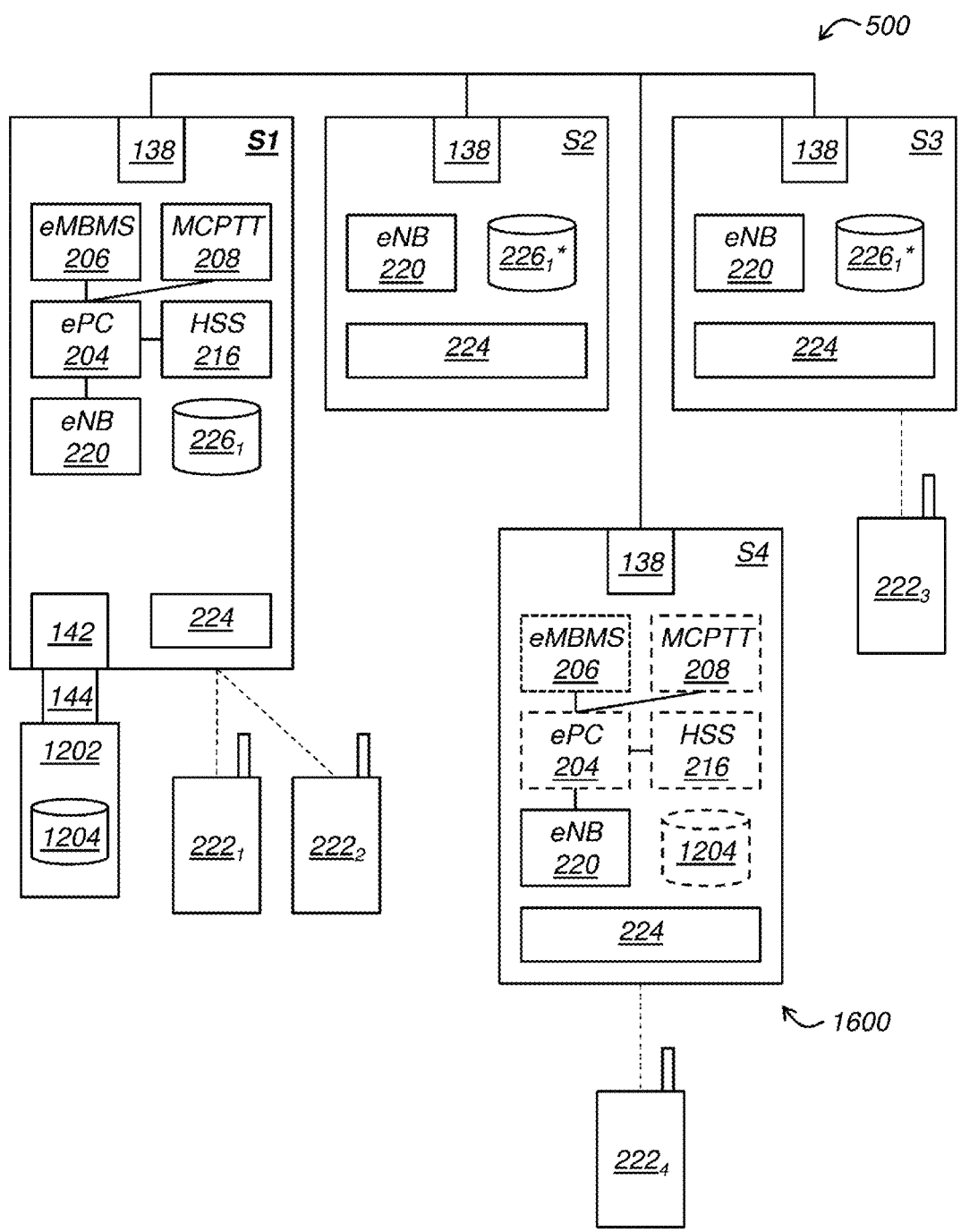
Figure 18:
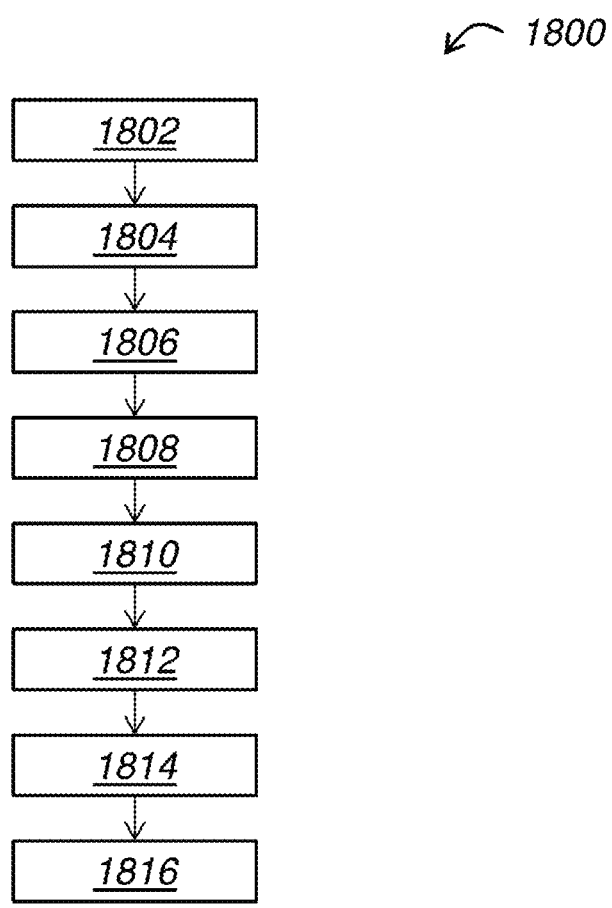
Figure 19:
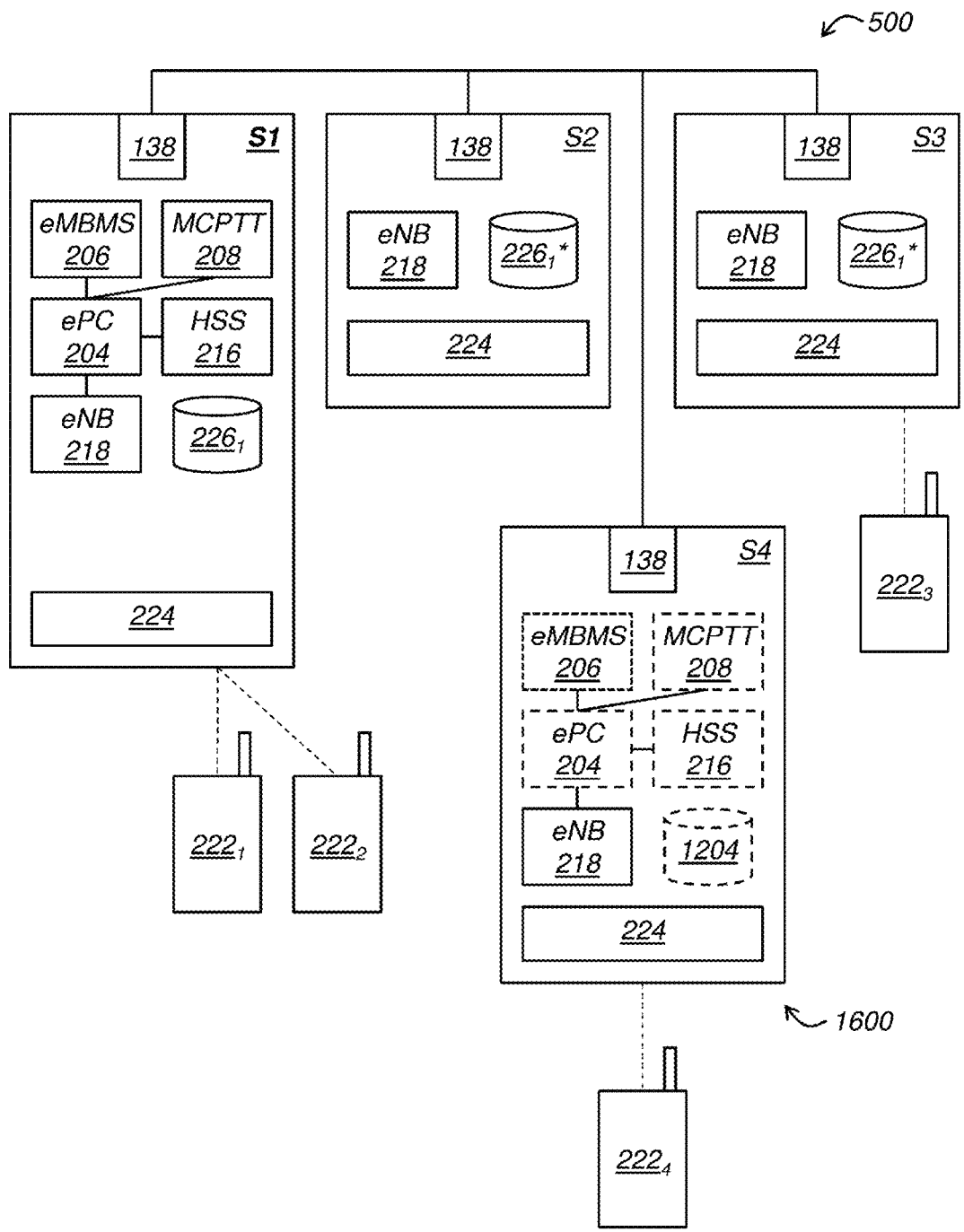
Figure 20:
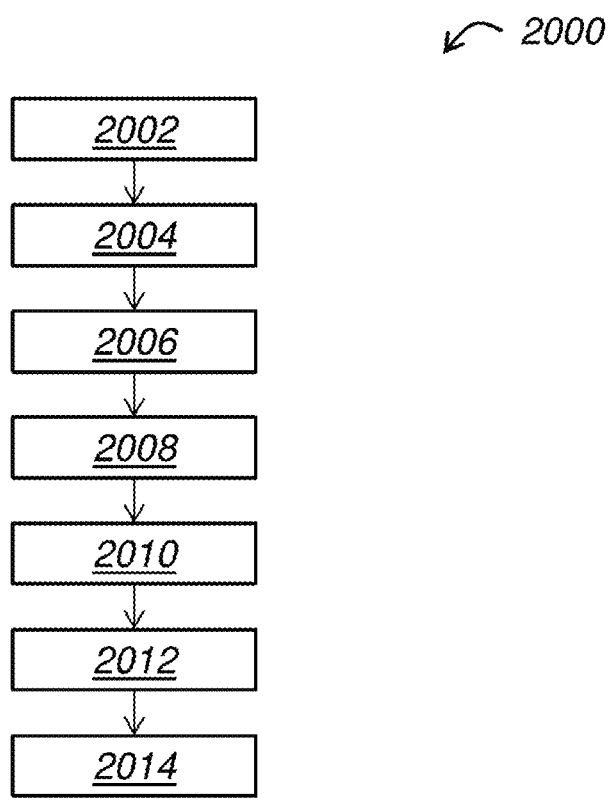
Figure 21:
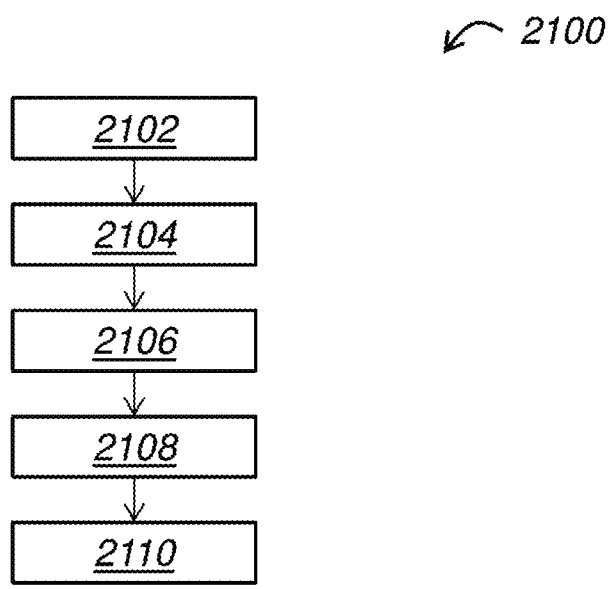
Figure 22:
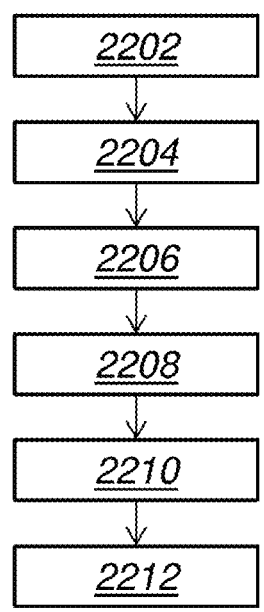

The invention will be better understood using the description which follows, given only by way of example, and prepared using the annexed drawings in which:

FIG. 1 is a schematic representation of the general structure, according to a first embodiment, of a transportable device implementing a local private mobile radio-communication network infrastructure, FIG. 2 is a schematic representation of the software structure of the device of FIG. 1, FIG. 3 is a schematic representation of the general structure, according to a second embodiment, of a transportable device implementing a local private mobile radio-communication network infrastructure, FIG. 4 is a schematic representation of the software structure of the device of FIG. 3, FIG. 5 is a schematic representation of the general structure of a private mobile radio-communication installation, comprising several devices according to the preceding Figures, FIG. 6 is a block diagram illustrating the steps of a method of operation of the installation of FIG. 5, FIG. 7 represents the installation of FIG. 5 after the devices have been connected to each other, FIG. 8 represents the installation of FIG. 7 after the connection of the mobile terminals, FIG. 9 represents the installation of FIG. 8 after the devices have been disconnected from a chosen device, FIG. 10 represents the installation of FIG. 9 after the moving of one of the mobile terminals, FIG. 11 is a block diagram illustrating the steps of a first method of reconfiguration of the installation of FIG. 5, FIG. 12 represents the installation of FIG. 5 after introduction of an external storage device, FIG. 13 represents the installation of FIG. 5 after the connection of a mobile terminal, FIG. 14 represents the installation of FIG. 5 after the removal of the external storage device, FIG. 15 is a block diagram illustrating the steps of a second method for the reconfiguration of the installation of FIG. 5, FIG. 16 represents, on one hand, the installation of FIG. 5 after introduction of an external storage device and, on the other hand, another installation, FIG. 17 represents the installations of FIG. 16 after their association, FIG. 18 is a block diagram illustrating the steps of a method for associating the installation of FIG. 5 with another installation, FIG. 19 represents the installation of FIG. 5 associated with another installation, FIG. 20 is a block diagram illustrating the steps of a method for reducing interference, according to first and second embodiments, FIG. 21 is a block diagram illustrating the steps of a method for reducing interference, according to a third embodiment, FIG. 22 is a block diagram illustrating the steps of a method for reducing interference, according to a fourth embodiment.

In reference to FIGS. 1 and 2, a transportable device 100 according to a first embodiment, implementing a local private mobile radio-communication network infrastructure (PMR) will now be disclosed.

The term "transportable" means for example that the device 100 has a bulk and weight allowing it to be transported by one person. For example, the device 100 is at the most 0.5 m³ and weighs 50 kg at most.

In reference to FIG. 1, the device 100 comprises, first, a housing 102. The housing 102 can for example be equipped with straps (not shown) or can be positioned on a support structure with straps in order to make it possible for one person to carry it on his back, like a backpack. The housing 102 can also be fastened to a wall (fixed) to which a mobile system for common federation can be connected.

The device 100 further comprises, in this housing 102, a radio head 104 with at least one socket 106 accessible from the outside of the housing 102 and intended to be connected to a radio antenna 108 extending to the outside of the housing 102, such that the device 100 can cover a certain area of radio coverage. In the disclosed example, the radio head 104 has two sockets 106, respectively connected to two radio antennas 108. Alternatively, more sockets 106 can be provided. The radio head 104 further comprises, in the disclosed example, a network interface 110 in compliance with the CPRI ("Common Public Radio Interface") standard. Alternatively, the network interface 110 could be any radio sample exchange support interface from and to the radio head. In 5G, this could be an eCPRI, eth1G, or JESD/ADI or any other physical link with a sample exchange protocol. If the radio head is inserted into the housing, that can be another standard or even proprietary.

In the context of the CPRI standard, different physical levels (fiber or electric) and software protocols (ORI, host, . . . ) are possible.

The device 100 further comprises, always in the housing 102, a computing system 112 connected to the radio head 104 and comprising at least one x86 microprocessor and at least one memory associated with the x86 microprocessor(s). As is known, the family of x86 microprocessors includes microprocessors compatible with the Intel 8086 (registered trademark) instructions. The benefit of using this family of microprocessors is that the software developed for a microprocessor of this family is easily transferable to another microprocessor of this family.

In the disclosed example, the computing system 112 comprises first and second computers 114, 116. Each computer 114, 116 comprises a motherboard 118, 120, an x86 microprocessor 122, 124 received by the motherboard 118, 120 and a main memory 126, 128, such as a RAM ("Random Access Memory") also received by the motherboard 118, 120.

Each computer 114, 116 further comprises a mass memory 130, 132, such as a hard disk, connected to the motherboard 118, 120. The computers 114, 116 further comprise, respectively, two network interfaces 134, 136, for example Ethernet, connected to each other in order to make it possible for the computers 114, 116 to communicate with each other. The first computer 114 further comprises, on the one hand, a second network interface 138, for example Ethernet, and has one port 140, for example RJ45, accessible from outside of the housing 102 and, on the other hand, a bus 142, for example USB, with a port 144, for example USB, also accessible from the outside of the housing 102. For its part, the second computer 116, it further comprises a programmable logic circuit 146, such as a FPGA ("Field-Programmable Gate Array") implementing a network interface 148 which complies, in the disclosed example, with the CPRI standard and is connected to the CPRI network interface 110 of the radio head 104 in order to make it possible for the second computer 116 and the radio head 104 to communicate with each other.

In reference to FIG. 2, the software structure of the computing system 112 will now be disclosed. As is known per se, this software structure contains computer code, which may be divided among several computing programs, and is intended to be copied into the main memory 126, 128 to which the x86 microprocessor 122, 124 has direct access in order to execute this computer code.

Thus, the mass memory 130 of the first computer 114 contains, first of all, a Linux (registered mark) operating system 202.

The mass memory 130 of the first computer 114 further contains computer code designed to be executed by the x86 microprocessor 122, for example, through the Linux operating system 202 so as to implement the following elements of the local infrastructure:
 a core network module 204,
 a broadcasting service module 206 connected to the core network module 204,
 a service module 208, connected to the core network module 204 and offering at least a PMR service, in the disclosed example, a Push To Talk or even Push To Transmit, or PTT service, and
 a subscriber server 216 connected to the core network module 204.

These elements are designed to use, for their operation, current operational data 226 recorded in the computing system 112, for example, in the mass memory 130 of the first computer 114. These current operational data 226 can change over time, for example, can be modified and/or supplemented, for example, as a function of the operation of the local infrastructure.

In the Figures, the current operational data 226 are shown as separate from the elements 204, 206, 208 and 216 of the local architecture. However, at least one part, or even all, of the current operational data 226 could be located in one or more of these elements 204, 206, 208 and 216.

These current operational data 226 comprise, for example, a current list of identifiers for mobile terminals authorized to connect to the local infrastructure. This current list is, for example, contained in the subscribers server 216. The identifiers are, for example, IMSIs ("International Mobile Subscriber Identity") also each stored in a SIM ("Subscriber Identity Module") card of the mobile terminal in question.

Current operational data 226 can further comprise, for each mobile terminal in the list, operational parameters. These operational parameters comprise, for example, one or more of the following data, for example, recorded in the subscribers server 216:
- a mobile terminal identifier such as the IMEI ("International Mobile Equipment Identity").
- an international call number, for example, the MSISDN ("Mobile Subscriber International ISDN Number"), and
- the service(s) to which the terminal subscribed, in particular in the disclosed example, the PTT service.

The operational parameters may further comprise other parameters such as for example, an IP address ("Internet Protocol") for the mobile terminal, which may be recorded in other components of the local infrastructure. They can also comprise application parameters, for example, used by the servers 206, 208. For example, for the server 208, these parameters can comprise a client profile and/or identifier ("clientMC").

The operational data can for example further comprise application parameters such as a list of application clients (PTT or other application) or profiles of application clients.

Default operational data can be specified in the device 100, for example, in the mass memory of the first computer 114. These default operational data are designed to be recovered at startup of the device 100, in order to be used during operation of the local infrastructure as current operational data 226. The default operational data can comprise in particular a default list of identifiers for mobile terminals authorized to connect to the local infrastructure.

The mass memory 130 of the first computer 114 further contains computer code designed to be executed by the x86 microprocessor 122, for example, through the Linux operating system 202 so as to implement a management module 224. The functions of the management module are disclosed further below.

Furthermore, the mass memory 132 of the second computer 116 contains first of all a second Linux operating system 218.

The mass memory 132 of the second computer 116 further contains computer code designed to be executed by the x86 microprocessor 124, for example, through the Linux operating system 218 so as to implement a base station module 220 of the local infrastructure. In the disclosed example, this base station module 220 is connected to the core network module 204 via the Ethernet network interfaces 134, 136.

The base station module 220 is designed to connect, via the network interfaces 148, 110 (CPRI in the disclosed example), the radio head 104 and the radio antenna (108), to any mobile terminal present in the coverage area of the device 100 and listed in the subscribers server 216, such as the mobile terminals $222_1$, $222_2$, $222_3$ shown in FIG. 2.

The base station module 220 is notably designed to manage radio-communications with the mobile terminals $222_1$, $222_2$, $222_3$ and to route the data between mobile terminals $222_1$, $222_2$, $222_3$ and the core network module 204.

The core network module 204 is particularly designed to verify, by consulting the subscribers server 216, that any mobile terminal searching to connect to the local infrastructure or to use the services offered by the service modules 206, 208 is authorized to do so. The core network module 204 is further designed to route the data between the service modules 206, 208 and the base station module 220. The core network module 204 is further designed to establish a communication path between two mobile telephones searching to communicate with each other.

In the disclosed example, the infrastructure complies with the LTE standard such that:
- the core network module 204 is an evolved Packet Core (ePC),
- the broadcast module 206 is an evolved Multimedia Broadcast Multicast Services (eMBMS),
- the subscriber server 216 is a Home Subscriber Server (HSS), and
- the base station module 220 is an evolved NodeB (eNB), as defined in this standard.

Alternatively, the infrastructure could be 3G or 5G or 3GPP or WiFi.

Additionally, the PTT service offered by the service module 208 can be the Mission Critical Push To Talk (MCPTT) service.

PTT is a service supported by a "compatible" standard or one that can be supported by the LTE standard. But it can also be well supported on WiFi . . . .

PTT is a possible application, but not the only one, and involves service and Qos on the LTE system.

An operating example of the device 100 for implementing a local PMR structure will now be disclosed.

In the disclosed example, the default operational data comprise a list of identifiers of mobile terminals authorized to connect to the local infrastructure, as well as, for each of them, a parameter indicating if the mobile terminal is authorized to use the PTT service. Table 1 below illustrates these default operational data—with the ID column grouping the IMSI identifiers (1, 2, 3 respectively for terminals $222_1$, $222_2$, $222_3$) and the PTT column grouping the parameters indicating whether or not the PTT service is authorized (O indicating such an authorization):

TABLE 1

| ID | PTT |
|---|---|
| 1 | O |
| 2 | O |
| 3 | O |

Upon startup of the device 100, the local infrastructure retrieves the default operational data in order to use them as current operational data. In particular, the subscribers server 216 retrieves the IMSI identifiers and the PTT service use authorizations.

When one of the mobile terminals $222_1$, $222_2$, $222_3$ enters into the coverage area of the device 100, a connection procedure with the local infrastructure is implemented. During this connection procedure, the mobile terminal in question exchanges data with the core network module 204 via the base station module 220, so that the core network module 204 can verify, by consulting the subscriber servers 216, that the mobile terminal in question is authorized to be connected to the local infrastructure and to use the PTT service. In the disclosed example, the IMSI identifier of the mobile terminal and the authorization to use the PTT service are sought in the subscriber server 216 and, if they are found there, this mobile terminal is authorized to connect and to use the PTT service.

It will be understood that the UE IMSI identifier cannot be permanently linked to an application client. Then, the lists can be dissociated and linked, for example, at the moment where: 1. A UE is connected (and authenticated)—HSS/2. Then, at the application level where a client connects and is authenticated (—PTT application list or other application). Thus, a client (user) can over time use or share a UE with other user clients. But another implementation—for some or all users—is to always use the same UE (which is dedicated to them) and therefore, to always be associated with the same UE.

During this connection procedure, an IP address is additionally allocated to the mobile terminal. Thus, in the disclosed example, the current operational data $226$ are modified in order to specify this IP address and an identifier for the device (in the present case, S1 for the device $100$) to which the mobile terminal is connected. Table 2 below illustrates the current operational data $226$ after the connection of the mobile terminals $222_1$, $222_2$, $223_3$.

TABLE 2

| ID | PTT | IP | DEVICE |
|---|---|---|---|
| 1 | O | 1.1.1.1 | S1 |
| 2 | O | 1.1.1.2 | S1 |
| 3 | O | 1.1.1.3 | S1 |

After connecting to the local infrastructure, the mobile terminals $222_1$, $222_2$, $223_3$ are then able to send telephone calls to each other via the local infrastructure.

Additionally, the mobile terminals $222_1$, $222_2$, $223_3$ can each launch a PTT application which communicates with the service module $208$ in order to use the PTT service such that, when the user of one of the mobile terminals $222_1$, $222_2$, $222_3$ presses a predetermined button of his mobile terminal, the latter enters transmission mode while the other mobile terminals enter receiver mode. In this configuration, audio and/or video streams transmitted by the transmitting mobile terminal are transmitted to the service module $208$, which broadcasts them to the mobile terminals in receiver mode. In order to do this, in the example described, the PTT service uses the broadcast module $206$. When the user releases the predetermined button, the mobile terminals $222_1$, $222_2$, $222_3$ each enter a standby mode until a user presses the predetermined button of his mobile terminal.

The application can support its own data corresponding to the preceding tables and managed concomitantly with the access terminals for its application clients.

In reference to FIGS. 3 and 4, a transportable device $300$ according to a second embodiment, implementing a local PMR infrastructure, will now be disclosed.

Device $300$ is identical to device $100$, except for the differences that will now be disclosed.

In reference to FIG. 3, the computer system $112$ comprises only the first computer $114$.

The radio head $104$ comprises a programmable logic circuit $302$, such as an FPGA, implementing an Ethernet network interface $304$, connected to the Ethernet network interface $134$ of the computer $114$, in order to make it possible for the computer $114$ and the radio head $104$ to communicate with each other. Alternatively, PCIe or other interfaces could be used.

In reference to FIG. 4, the base station module $220$ is installed on the computer $114$ and intended to be executed by the latter.

The operational example of device $100$ disclosed above is applicable to device $300$.

Since device $300$ uses a single computer instead of the two in device $100$, it may have a reduced size and/or weight. In contrast, it could not be capable of managing as many subscribers as device $100$.

In reference to FIG. 5, a PMR installation $500$ will now be disclosed.

In general, a PMR installation according to the present invention comprises one or more devices which can each be like those in FIGS. 1 and 2, or even like those in FIGS. 3 and 4. Thus, as was disclosed in reference to FIGS. 1 to 4, each installation device comprises, on the one hand, a local PMR installation comprising a core network module $204$, a broadcast service module $206$, a PTT service module $208$, a subscribers server $216$ and a base station module $220$ and, on the other hand, a network interface $138$, a management module $224$, this/these management module(s) $2224$ forming a management system, also designated by reference $224$, and default operational data.

In the disclosed example, installation $500$ comprises several devices (three in the disclosed example, respectively bearing the references S1, S2, S3). The default operational data for these devices S1, S2, S3 bear different references, respectively $226_1$, $226_2$ et $226_3$, in order to distinguish them.

In reference to FIGS. 6 to 10, a first method $600$ for operation of the installation $500$ will now be disclosed.

During a step $602$, devices S1, S2, S3 are connected to each other via their network interfaces $138$ by a network connection ("backhaul"). This connection can be wired or even, preferably, wireless.

During a step $604$, the management system $224$ chooses one of devices S1, S2, S3. In the disclosed example, device S1 is chosen. For example, a priority rank is first attributed to each device S1, S2, S3 and recorded in this device S1, S2, S3. The chosen device is then the one with the highest priority rank.

During a step $606$, the management system $224$ deactivates the core network module $204$, the service modules $206$, $208$, the subscribers server $216$ and the operational data $226_2$, $226_3$ for each device S2, S3 not chosen.

During a step $608$, the management system $224$ connects the base station module $220$ of each device S1, S2, S3 to the core network module $204$ of chosen device S1 in order to form a distributed PMR infrastructure. In particular, the base station module $220$ for each device S2, S3 not chosen is connected via network interfaces $138$.

During a step $610$, chosen device S1 recovers default operational data $226$ that it contains so that its modules $204$, $206$, $208$ and its server $216$ may use it. In the disclosed example, the default operational data $226_1$ are the same as those disclosed above for device $100$ and are recalled in table 3 below:

TABLE 3

| ID | PTT |
|---|---|
| 1 | O |
| 2 | O |
| 3 | O |

During a step $612$, the management system $224$ creates, on each not chosen device S2, S3, a synchronized copy $226_1{}^*$ of the operational data $226_1$ of chosen device S1. This means, in particular, that management system $224$ keeps this/these copies $226_1*$ up to date in case of modification over time of original operational data $226_1$.

The result of steps 602 to 612 is shown in FIG. 7, with the deactivated components in dotted lines.

During a step 614, the mobile telephones $222_1$, $222_2$, $222_3$ connect to the distributed infrastructure. To do this, a procedure for connection to the distributed infrastructure is implemented, with this connection procedure being similar to that disclosed above for the device 100, by replacing the local architecture with the distributed architecture.

The operational data 226 are therefore modified as a result (along with the synchronized copies $226_1*$), as shown in the following table 4:

TABLE 4

| ID | PTT | IP | DEVICE |
|---|---|---|---|
| 1 | O | 1.1.1.1 | S1 |
| 2 | O | 1.1.1.2 | S1 |
| 3 | O | 1.1.1.3 | S3 |

The IP address can (in certain implementation cases where the client is reactive on a single server) be modified by the server. What is important is that the client identity must be valid and active. Furthermore, in the disclosed example, the IP address can be either static or dynamic so as to be able to change.

The result of step 614 is shown in FIG. 8.

During a step 616, the device S1 is disconnected from devices S2, S3.

During a step 618, device S1 continues to operate in order to form a first new PMR infrastructure, without the base stations 220 of devices S2 and S3.

In parallel, during a step 620, the management system 224 of devices S2, S3, always interconnected, chooses a device from among the always connected devices S2, S3. In the disclosed example, device S2 is chosen.

During a step 622, the management system 224 deactivates the core network module 204, the service modules 206, 208 and the subscribers server 216 for each non-chosen device S3 and activates the core network module 204, the service modules 206, 208 and the subscribers server 216 of the chosen device S2.

During a step 624, the management system 224 connects the base station module 220 of each device S2, S3 to the core network module 204 of the chosen device S2 in order to form a second new PMR infrastructure, which, in the disclosed example, is an infrastructure distributed over devices S2, S3.

During a step 626, the management system 224 provides elements 204, 206, 208, 216 of the chosen device S2 with the copy $226_1*$ of the operational data present on the chosen device S2, so that these elements may use these operational data for the operation of the distributed PMR infrastructure.

The result of steps 616 to 626 is shown in FIG. 9. From this moment, there therefore exist two PMR infrastructures: a first formed by device S1 and a second formed by devices S2 and S3. These two PMR infrastructures then independently evolve from each other such that the operational data can diverge. Thus, in FIG. 9, the operational data used by elements 204, 206, 208, 216 of device S2 bear the reference $226_1'$ to distinguish them from operational data $226_1$ of device S1. Additionally, in the second PMR infrastructure, a synchronized copy $226_1'*$ of operational data 2261' is created by the management system 224 on each non-chosen device S3.

During a step 628, the mobile telephone $222_2$ leaves the coverage area of device S1 and enters the coverage area of device S2.

Since the operational data $226_1'$ result from the operational data $226_1$, before cutting, they comprise the list of authorized mobile terminals for the original PMR infrastructure and the parameters for all of these mobile terminals. Thus, mobile terminal $222_2$ is authorized to connect to the second PMR infrastructure, and this change in the PMR infrastructure can be made while minimizing service interruption for mobile terminal $222_2$.

The result of step 628 is shown in FIG. 10.

In reference to FIGS. 11 to 14, a first method 1100 for reconfiguration of the installation 500 will now be described.

Initially, installation 500 is in the state shown in FIG. 8, i.e., it implements a distributed PMR infrastructure, in which device S1 is chosen. This distributed PMR infrastructure uses current operational data $226_1$ which comprise the current list of identifiers of mobile terminals and, for each one, the operational parameters.

During a step 1102, shown in FIG. 12, an external storage device 1202 (a USB key in the disclosed example), is received in the external port 144 of one of devices S1, S2, S3 of installation 500 (preferably, the chosen device S1, as in the disclosed example). This external storage device 1202 contains supplementary operational data 1204 comprising a supplementary list of identifiers of mobile terminals and possibly, for each one of these terminals, supplementary operational parameters.

The supplementary operational data 1204 are, for example, those shown in table 5 below:

TABLE 5

| ID | PTT |
|---|---|
| 4 | O |
| 5 | O |
| 6 | N |

During a step 1104, the management system 224 detects the reception or the presence of the external storage device 1204 in the external port 144.

The following steps 1106 and 1108 are, for example, implemented automatically as a consequence of the detection of step 1104. Alternatively, in consequence of the detection of step 1104, the management system 224 requires a user validation and the following steps 1106 and 1108 are implemented if the user is validated.

During a step 1106, the management system 224 retrieves, from the external storage device 1202 received in the external port 144, the supplementary operational data 1204 and provides them to the chosen device S1.

During step 1108, the management system 224 modifies the current operational data $226_1$ of device S1 using the supplementary operational data 1204, in particular the current list is modified using the supplementary list. In the disclosed example, the modification is a merger of the current and supplementary data involving, in particular, a merger of the current and the supplementary lists. Thus, the identifiers of the supplementary list (which are not already present in the current list) are added to the current list, with, if applicable, their associated operational parameters. These current operational data $226_1$, after modification, are thus used by elements 204, 206, 208, 216 of chosen device S1.

The current operational data $226_1$, after modification, from the disclosed example, are shown in table 6 below:

TABLE 6

| ID | PTT | IP | DEVICE |
|---|---|---|---|
| 1 | O | 1.1.1.1 | S1 |
| 2 | O | 1.1.1.2 | S1 |
| 3 | O | 1.1.1.3 | S3 |
| 4 | O | | |
| 5 | O | | |
| 6 | N | | |

Cases of collision (the same identifier appears in both lists) are processed according to predetermined rules. For example, preferably, the parameters present in the current operational data for the identifier in collision are stored, while the parameters present in the supplementary operational data for this identifier in collision are rejected.36] The merger can be temporary (it is necessary to save the path for the main list and the supplementary list) or not (a true merge, in the base $226_1$). In the first case, for example, a return to the initial state is possible. In the second case, for example, reinitializing the list at the next startup is possible (for example, by inserted USB key requiring the consideration of "a totally new, current list).

Additionally, the merge can be temporary and, therefore, reversible. In this case, it is specified to save a path to the principal and secondary lists.

During a step 1110, shown in FIG. 13, a mobile telephone $222_4$, with the identifier 4, connects to device S3 and the connection procedure disclosed previously is implemented. During this connection procedure, the mobile terminal $222_4$ exchanges data with the core network module 204 of the chosen device S1, so that this core network module 204 can verify, by consulting the subscriber servers 216, that the mobile terminal $222_4$ is authorized to connect to the local infrastructure and to use the PTT service. Since the identifier of this mobile terminal $222_4$ appears in the current list $226_1$ after modification and is associated with a use authorization for the PTT service, mobile terminal $222_4$ is authorized to connect to and use the PTT service.

The following steps 1112 to 1118 are shown in FIG. 14.

During step 1112, the external storage device 1202 is rendered inaccessible to installation 500. In the disclosed example, the external storage device 1202 is removed from the external port 144, for example, by a user. Alternatively, the external storage device 1202 is rendered inaccessible by disconnecting it by software (software disconnect operation known as "unmount"), without needing to be physically removed from the external port 144.

During a step 1114, the management system 224 detects the inaccessibility of the external storage device 1202. For example, the management system 224 detects the removal, or the software unmount of the external storage device 1202.

During a step 1116, automatically and as a consequence of the detection of the inaccessibility of the external storage device, the management system 224 purges the current operational data 1302 by purging the current list in order to revert to the current list before modification and deleting the operational parameters associated with the deleted identifiers.

In the disclosed example, the current operational data 2261 after purging are shown in table 7 below:

TABLE 7

| ID | PTT | IP | DEVICE |
|---|---|---|---|
| 1 | O | 1.1.1.1 | S1 |
| 2 | O | 1.1.1.2 | S1 |
| 3 | O | 1.1.1.3 | S3 |

During a step 1118, since the identifier of terminal $222_4$ is no longer present in the list of identifiers of the current operational data $226_1$, it is no longer authorized to use the PMR infrastructure and is therefore disconnected at the initiative of the latter.

It will be understood that the method 1100 is also applicable to a system comprising a single autonomous device, like device 100 or device 300.

Alternatively, step 1108 of modification of the current list could comprise replacement of the current list by the supplementary list.

Additionally, a similar method could be implemented when the supplementary operational data are on a remote server connectible by LAN/wifi/4G/bluetooth/Network, or even on any accessible storage element, and which serves for example for initializing a computer system (by booting up, for example), such as a remote server, a hard disk (removable, like a USB, SD card, . . . , or not removable, like a local HDD/SSD hard disk accessible by a human), DC, DVD, . . . .

The application data (MCPTT or other(s)) can use the same concept of reconfiguration of lists.

In reference to FIGS. 15 to 17, a second method 1500 for reconfiguration of the installation 500 will now be described.

This method 1500 includes first of all steps 1102, 1104, 1106 and 1108 of method 1100.

However, as shown in FIG. 16, in method 1500, the supplementary operational data 1204 are the current operational data used in another PMR installation 1600 (comprising a single device S4 in the disclosed example).

The method 1500 then comprises the following steps 1502, 1504 and 1506 shown in FIG. 17.

During a step 1502, the other installation 1600 is connected to installation 1500. In the disclosed example, devices S1 to S4 are connected to each other via their network interfaces 138 by a network connection.

During a step 1504, the management system 224 (grouping the management modules 224 of both installations 500 and 1600) deactivates the core network module 204, the service modules 206, 208 and the subscribers server 216 for each device of installation 1600 (device S4 in the disclosed example).

During a step 1506, the management system 224 connects the base station module 220 of each device of installation 1600 (device S4 in the disclosed example) to the core network module 204 of the chosen device S1 of installation 500 so as to form a new distributed PMR infrastructure, federating the two installations 500, 1600.

Since the current operational data $226_1$ comprise the operational data 1204 of installation 1600, the mobile terminals connected to installation 1600 can connect to the federation of installations 500 and 1600.

In reference to FIGS. 18 and 19, a method 1800 of federation of installation 500 with at least one other installation (installation 1600 described previously in the disclosed example) will now be described.

Initially, installation 500 is in the state shown in FIG. 8, i.e., it implements a distributed PMR infrastructure, in which device S1 is chosen. This distributed PMR infrastructure uses the current operational data $226_1$ which comprise the current list of identifiers of mobile terminals and, for each one, the operational parameters.

The following steps are illustrated in FIG. 19.

During a step 1802, installation 1600 is connected to installation 500. In the disclosed example, devices S1 to S4 are connected to each other via their network interfaces 138 by a network connection.

During a step 1804, the management system 224 (grouping the management modules 224 of installation 500) detects the connection of installation 1600 and requires a user validation and the following steps are implemented in the case of validation of the user.

During a step 1806, the management system 224 retrieves, from installation 1600 (and, more specifically, in the disclosed example, from device S4), through the network connection, the supplementary operational data 1204 and provides them to the chosen device S1.

During a step 1808, the management system 224 modifies the current operational data $226_1$ of device S1 using the supplementary operational data 1204, in particular the current list is modified using the supplementary list. In the disclosed example, the modification is a merger of the current and supplementary data involving, in particular, a merger of current and supplementary lists. Thus, the identifiers of the supplementary list (which are not already present in the current list) are added to the current list, with, if applicable, their associated operational parameters. These current operational data $226_1$, after modification, are thus used by elements 204, 206, 208, 216 of chosen device S1. The current operational data $226_1$, after modification, from the disclosed example, are therefore the same as the ones illustrated in table 6 above.

Cases of collision (the same identifier appears in both lists) are processed according to predetermined rules, as explained for method 1100.

During a step 1810, the management system 224 (grouping the management modules 224 of both installations 500 and 1600) deactivates the core network module 204, the service modules 206, 208 and the subscriber server 216 for each device of installation 1600 (device S4 in the disclosed example).

During a step 1812, the management system 224 connects the base station module 220 of each device of installation 1600 (device S4 in the disclosed example) to the core network module 204 of the chosen device S1 of installation 500 so as to form a new distributed PMR infrastructure, federating the two installations 500, 1600.

Since the current operational data $226_1$ comprise the operational data 1204 of installation 1600, the mobile terminals connected to installation 1600 can connect to the federation of installations 500 and 1600.

During a step 1814, installation 1600 is disconnected from installation 500.

During a step 1814, the management system 224 (grouping the management modules 224 of installation 500) detects this disconnection.

During a step 1816, automatically as a consequence of the detection of the disconnection, the management system 224 purges the current operational data 1204 by purging the current list in order to revert to the current list before modification and by deleting the operational parameters associated with the deleted identifiers.

Alternatively, step 1816 of purging could also be manually forced by a user on both sides (for example, on installation 500 or on installation 1600), or even be executed during a reset or even during the next startup, depending on the configuration.

It will be understood that, in an alternative embodiment, step 1808 of modification of the current list could comprise replacement of the current list by the supplementary list.

In reference to FIG. 20, a method 2000 for the reduction of interference caused by a PMR infrastructure, according to a first embodiment, will now be described. The PMR infrastructure is, for example, implemented by a device such as device 100, or device 300, or by an installation such as installation 500 federating several devices. Thus, the PMR infrastructure comprises, in particular, a core network module 204, and at least one base station 220, to which mobile terminals, such as mobile terminals $222_1$-$222_5$, can connect.

The following steps 2002 to 2012 are executed for one or each of several mobile terminals connected to the base station 220.

During a step 2002, the mobile terminal in question receives a radio-communication downlink signal transmitted by the base station 220. This downlink signal occupies a predefined frequency band used by the base station 220 and the mobile terminal in order to communicate with each other.

During a step 2004, the mobile terminal determines at least one characteristic of the received downlink signal and transmits this/these characteristic(s) to the base station 220. For example, one or more of the following characteristics are determined and transmitted: a Signal to Noise Ratio (SNR), a Signal to Interference and Noise Ratio or SINR, a Reference Signal Received Power (RSRP) and a Reference Signal Received Quality (RSRQ).

During a step 2006, the base station 220 receives a radio-communication uplink signal transmitted by the mobile terminal. This uplink signal occupies a predefined frequency band used by the base station 220 and the mobile terminal in order to communicate with each other.

Frequency bands for downlink and uplink signals can be identical, for example, in the case of time multiplexing, or different for example in the case of frequency multiplexing.

During a step 2008, the base station 220 determines at least one characteristic of the received uplink signal. For example, as for the downlink signal, the characteristic(s) comprise one or more from among: SNR, SINR, RSRP and RSRQ.

During a step 2010, the base station 220 determines a distance separating it from the mobile telephone. For example, timing calculated during TA (Timing Alignment Procedures) protocol sequences in 3GPP.

During a step 2012, the base station 220 searches a disturbance in the frequency band of the downlink signal and in the frequency band of the uplink signal, using the characteristics of the uplink and downlink signals obtained by the base station 220.

For example, the SNR of the downlink signal is compared to a threshold, called the downlink threshold, and the SNR of the uplink signal is compared to a threshold, called the uplink threshold. If one of the two SNRs is bad, i.e., less than the associated threshold, the presence of a disturbance affecting the mobile terminal in question is detected.

If several characteristics are extracted from each signal, downlink and uplink, these characteristics are for example grouped into a global characteristic that can be compared to a threshold. Alternatively, each characteristic is compared to an associated threshold and the presence of a disturbance is detected when a predetermined number of characteristics, for example, at least one, or even all, cross their thresholds.

Alternatively still, more complicated decision criteria, applied to the characteristic(s) obtained by the base station 220 can be used.

Preferably, the search for a disturbance considers the distance between the base station 220 and the mobile terminal. For example, each threshold depends on this distance. For example, in the case of the SNR, the threshold decreases with the distance. In fact, the farther the mobile terminal is from the base station 220, the worse is the SNR, i.e., the smaller it is. Thus, it is normal to find a weak SNR for a greater distance, without this implying the presence of a disturbance.

During a step 2014, in the case of detection of a disturbance in the frequency band of the uplink signal and/or the downlink signal for at least one mobile terminal connected to the base station 220, the base station 220 decreases its transmission power at least in the frequency band used by the base station to transmit downlink radio-communication signals to the connected mobile terminals.

In fact, the presence of a disturbance can indicate the presence of a disturbing device transmitting in the same frequency band as the PMR infrastructure. However, it frequently occurs that several PMR infrastructures are used at the same time, within the same area. Thus, in this context, it often occurs that the disturbing device is a base station of another PMR infrastructure. Thus, the fact that the base station 220 decreases its transmission power makes it possible to reduce the interferences caused by this base station 220 on the communications of the other PMR infrastructure.

It is possible to specify several thresholds of the user's choice before choosing to reduce the power, for example: —threshold 1, Normal/max. performance; —threshold 1, Interferences—max. coverage; —threshold 3: interferences—medium coverage (reduced power); —threshold 4: interferences—max. speed—max. power reduction.

In a second embodiment, steps 2002 to 2010 are executed for each one of a plurality of mobile terminals connected to the base station 220.

Furthermore, during a step 2012 of searching a disturbance, the SNRs of the uplink and downlink signals of a first mobile terminal are for example respectively compared to the SNRs of the downlink and uplink signals of a second mobile terminal, farther from the base station than the first mobile terminal (according to their distances from the base station 220 obtained by the latter. If at least one of the SNRs (preferably both) of the first mobile terminal is less than the corresponding SNNR of the second mobile terminal, the presence of a disturbance is detected. In fact, in the absence of a disturbance, the SNRs of the mobile terminals should increase when nearing the base station. Thus, when this is not the case, a disturbance which may be coming from another PMR infrastructure, is degrading the SNR.

In reference to FIG. 21, a method 2100 for the reduction of interference according to a third embodiment, will now be described.

During a step 2102, the base station 220 suspends, for at least a predefined interval of time, the transmission of the downlink signal in the frequency band dedicated to the downlink signals.

The use of several intervals makes it possible to avoid having a too long cut-off transmission time which leads to a loss of connection of the terminals.

For example, a 20 ms cut-off every 500 ms for 5 sec, rather than 20*2*5=200 ms cutoff which risks the loss of communication, is better.

During a step 2104, the base station 220 monitors the frequency band in order to receive an ambient radio-communication signal contained in this frequency band and coming from the environment.

For example, the base station 220 can comprise a transmission antenna dedicated to the transmission of downlink signals and a reception antenna dedicated to the reception of uplink signals, as well as an analog/digital converter connected to these antennas. In this case, the converter can be designed to invert its operations for the transmission antenna, so as to acquire the ambient signal reaching the transmission antenna. Alternatively, an additional acquisition card can be provided, connected to the transmission antenna in order to acquire the ambient signal reaching the transmission antenna.

During a step 2106, the base station 220 determines at least one characteristic of the received ambient signal. For example, a power of the ambient signal is determined.

During a step 2108, the base station 220 searches a disturbance in the frequency band of the downlink signals, using the characteristic(s) of the ambient signals obtained by the base station 220.

For example, the power of the ambient signal is compared to a threshold. If this power is greater than the threshold, the presence of a disturbance is detected. In fact, if the power is greater than the threshold, the environment is very noisy, which could be caused by another PMR infrastructure.

During a step 2110, in the case of detection of a disturbance in the frequency band of the downlink signals, the base station 220 decreases its transmission power at least in the frequency band of the downlink signals.

In reference to FIG. 22, a method 2200 for the reduction of interference, according to a fourth embodiment, will now be described.

During a step 2202, the base station 220 requests all the mobile terminals connected to suspend, for example, during at least a predefined interval of time, the transmission of the uplink signals in the frequency band dedicated to uplink signals.

During a step 2204, in response to the request of the base station 220, the connected mobile terminals suspend, during the predetermined interval(s) of time, the transmission of uplink signals.

During a step 2206, the base station 220 monitors the frequency band dedicated to the uplink signals in order to receive an ambient radio-communication signal contained in this frequency band and coming from the environment.

For example, the base station 220 can use the receiving antenna normally used to receive uplink signals.

During a step 2208, the base station 220 determines at least one characteristic of the received ambient signal. For example, a power of the ambient signal is determined.

During a step 2210, the base station 220 searches a disturbance in the frequency band of the uplink signals, using the characteristic(s) of the ambient signals obtained by the base station 220. For example, the power of the ambient signal is compared to a threshold. If this power is greater than the threshold, the presence of a disturbance is detected.

During a step 2212, in the case of detection of a disturbance in the frequency band of the uplink signals, the base station 220 decreases its transmission power at least in the frequency band of the downlink signals.

An example of use of one or more of the preceding methods for the reduction of interference will now be described.

Initially, at least two PMR infrastructures, each one implemented, for example, by a transportable device like device 100 or device 300, are deployed at a distance from each other.

A user determines the PMR infrastructure with the greatest transmission power and, as a consequence, activates on this PMR infrastructure an interference reduction procedure.

Thus, in operation, the powerful PMR infrastructure implements, at regular or irregular time intervals, at least one of the methods for interference reduction. For example, time intervals are between 1 ms and 200 ms.

For example, at least one of the methods according to the first and second embodiments disclosed above, is implemented, since they do not need to interrupt communications with the mobile telephones. When a disturbance is detected, at least one of the methods according to the third and fourth embodiments, which requires an interruption of the communications, can be implemented in order to confirm the presence of the disturbance.

In the disclosed example, initially, the two PMR infrastructures are deployed remotely, such that the interference reduction procedure does not detect a disturbance.

Since PMR infrastructures are mobile, they can come close to or move away from each other.

Several topologies are possible on the basis of fixed, mobile and roaming infrastructures. The following disturbances are possible:
Mobile-mobile
Mobile-fixed
Mobile roaming
Roaming-fixed
Roaming-roaming In addition, these systems can start up/shut down, near each other, move away from each other . . . . All cases are possible and to be taken into consideration in detail if possible.

The problem is that the stations are not interconnected, permanently turned on and designed a priori . . . and additionally, the infrastructure can be mobile AND start up/shut down depending on operational tasks.

Thus, the procedure for the reduction of interference implemented by the powerful PMR infrastructure detects a disturbance caused by the less powerful PMR infrastructure. This means that the less powerful PMR infrastructure is certainly extremely disturbed by the powerful PMR infrastructure. In consequence, the powerful PMR infrastructure decreases its transmission power, so as to reduce the disturbances it causes to the less powerful PMR infrastructure.

Another advantage of the invention is to be able to use the same Radio and antenna chain as the eNodeb, and if possible the same x86 digital computing means (or x86 microprocessor(s)) as those implementing the computer code executing the base station.

It is clear that a method for the reduction of interference makes it possible to reduce the interferences between PMR infrastructures, even when the latter are independent.

Additionally, we will note that the invention is not limited to the previously disclosed embodiments.

Typically, it can be applied to the MCPTT application or to any other possible application (professional or general public) that requires, for example, a users database. Several applications, supported simultaneously, are also possible. MCPTT is an example, but not necessarily PTT nor PMR.

The principle also applies to the LTE (HSS and UE) systems part, and optionally, also to the infrastructure part (epc/eNB/PDN/ . . . ).

The invention also applies to 3G, 4G, 5G infrastructures, . . . and even, if necessary, to a WIFI infrastructure, or mixed 4G/WiFi, as long as it applies on IP protocol base networks for the application part. Additionally, it is also possible to combine or federate two different architectures, for example, one in wifi and the other in LTE (application base identical to that disclosed, users base in HSS LTE side and AP ("access point") Base Wifi side. Since we use the IP protocol, the (Wifi/LTE) type and the IP address are sufficient for the merger of lists in order to navigate. The LTE case applies at the OFDM physical level equivalent to Wimax, WiFi, 4G and even 5G.

The database and table principle also applies to client data and identities (located on the terminals) of locally generated applications. (not only to mobile terminals and their IMSI identities).

PMR is a possible use; in fact, also possible for the General Public, depending on the application used, because the invention could also be applied. Typically, a MEC (Mobile Edge Computing) mode could be applied to the system as it is, with a specific application.

Additionally, a choice can also be made not to reduce interferences using a certain threshold, in order to retain the coverage of the mobile terminals, but involving a loss of capacity. If we reduce power, one system or both can lose coverage and therefore UEs. The algorithm can then decide that, at the level of 'acceptable' interference, we continue to have 'significant' interferences, even at the risk of losing a great deal of speed because coverage is the primary need. There can therefore be several thresholds, depending on the coverage vs. speed configuration.

In fact, it will be clear to the person skilled in the art that various modifications can be made to the embodiments disclosed above, in light of the teaching that has just been disclosed to him. In the detailed description of the invention above, the terms used must not be interpreted as limiting the invention to the embodiments explained in this description, but must be interpreted to include all of the equivalents which can be foreseen by the person skilled in the art by applying his general knowledge to the implementation of the teaching that has just been disclosed to him.

What is claimed is:

1. A method for a reduction of interference caused by a private mobile radio-communication network infrastructure, comprising:
for at least one mobile terminal connected to a base station of the private mobile radio-communication network infrastructure, obtaining at least one characteristic of at least one radio-communication signal occupying a frequency band used by the base station and the at least one mobile terminal in order to communicate with each other and received by the at least one mobile terminal or by the base station, wherein said at least one characteristic is either
a Signal to Noise Ratio,
a Signal to Interference and Noise Ratio, or
a Reference Signal Received Quality;
searching, using the at least one characteristic, of a disturbance in the frequency band; and
in a case of detection of said disturbance in the frequency band, decreasing a transmission power of the base station at least in a transmission frequency band used by the base station to transmit radio-communication signals to at least one connected mobile terminal of the at least one mobile terminal.

2. The method according to claim 1, wherein the at least one radio-communication signal comprises a downlink radio-communication signal, transmitted by the base station and received by the at least one mobile terminal.

3. The method according to claim 1, wherein the at least one radio-communication signal comprises an uplink radio-communication signal, transmitted by the at least one mobile terminal and received by the base station.

4. The method according to claim 2, wherein the at least one characteristic comprises one or more of: a signal-to-noise ratio, a signal-to-interference-plus-noise ratio, a reference signal received power and a reference signal received quality.

5. The method according to claim 1, further comprising:
obtaining a distance separating the at least one mobile terminal from the base station; and
wherein the searching for the disturbance takes the distance into consideration.

6. The method according to claim 1, further comprising:
the base station suspending transmission in the frequency band during an interval of time; and
wherein the at least one radio-communication signal comprising a radio-communication signal received by the base station during the interval of time.

7. The method according to claim 1, further comprising:
in response to a request from the base station, suspending transmission by the at least one mobile terminal in the frequency band during an interval of time; and
wherein the at least one radio-communication signal comprises a radio-communication signal received by the base station during the interval of time.

8. The method according to claim 6, wherein the at least one characteristic of the radio-communication signal received by the base station during the interval of time comprises a power of the radio-communication signal.

9. A non-transitory computer readable medium comprising a computer program that comprises instructions to execute a method for a reduction of interference caused by a private mobile radio-communication network infrastructure, when said computer program is executed on a computer, and wherein said method comprises:
for at least one mobile terminal connected to a base station of the private mobile radio-communication network infrastructure, obtaining at least one characteristic of at least one radio-communication signal occupying a frequency band used by the base station and the at least one mobile terminal in order to communicate with each other and received by the at least one mobile terminal or by the base station, wherein said at least one characteristic is either
a Signal to Noise Ratio,
a Signal to Interference and Noise Ratio, or
a Reference Signal Received Quality;
searching, using the at least one characteristic, of a disturbance in the frequency band; and
in a case of detection of said disturbance in the frequency band, decreasing a transmission power of the base station at least in a transmission frequency band used by the base station to transmit radio-communication signals to at least one connected mobile terminal of the at least one mobile terminal.

10. A base station of a private mobile radio-communication network infrastructure, comprising:
software and hardware components configured to:
for at least one mobile terminal connected to the base station, obtain at least one characteristic of at least one radio-communication signal occupying a frequency band used by the base station and the at least one mobile terminal in order to communicate with each other and received by the at least one mobile terminal or by the base station, wherein said at least one characteristic is either
a Signal to Noise Ratio,
a Signal to Interference and Noise Ratio, or
a Reference Signal Received Quality;
search, using the at least one characteristic, for a disturbance in the frequency band; and
in a case of detection of said disturbance in the frequency band, decrease a transmission power at least in a transmission frequency band used by the base station to transmit radio-communication signals to at least one connected mobile terminal.

* * * * *